(12) United States Patent
Berglund et al.

(10) Patent No.: US 11,096,138 B2
(45) Date of Patent: Aug. 17, 2021

(54) METHODS AND APPARATUSES FOR HANDLING SYNCHRONIZATION OF A WIRELESS DEVICE

(71) Applicant: Telefonaktiebolaget LM Ericsson (publ), Stockholm (SE)

(72) Inventors: Joel Berglund, Linköping (SE); Henrik Rydén, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 41 days.

(21) Appl. No.: 16/620,565

(22) PCT Filed: Jul. 11, 2017

(86) PCT No.: PCT/SE2017/050775
§ 371 (c)(1),
(2) Date: Dec. 9, 2019

(87) PCT Pub. No.: WO2019/013679
PCT Pub. Date: Jan. 17, 2019

(65) Prior Publication Data
US 2020/0187140 A1   Jun. 11, 2020

(51) Int. Cl.
*H04W 56/00* (2009.01)
*H04L 5/00* (2006.01)
(Continued)

(52) U.S. Cl.
CPC ....... *H04W 56/0015* (2013.01); *H04L 5/0048* (2013.01); *H04W 56/0045* (2013.01); *H04W 72/0446* (2013.01); *H04W 88/06* (2013.01)

(58) Field of Classification Search
CPC ......... H04W 56/0015; H04W 56/0056; H04W 72/0446; H04W 88/06; H04L 5/0048
(Continued)

(56) References Cited

U.S. PATENT DOCUMENTS

2007/0047591 A1   3/2007   Senthilnathan et al.
2010/0105332 A1   4/2010   McHenry et al.
(Continued)

FOREIGN PATENT DOCUMENTS

WO   9818233 A1   4/1998
WO   0219743 A2   3/2002
(Continued)

OTHER PUBLICATIONS

Unknown, Author, "3rd Generation Partnership Project; Technical Specification Group Services and System Aspects; Feasibility Study on New Services and Markets Technology Enablers for Critical Communications; Stage 1 (Release 14)", 3GPP TR 22.862 V14.1.0, Sep. 2016, pp. 1-31.
(Continued)

*Primary Examiner* — Peter G Solinsky
(74) *Attorney, Agent, or Firm* — Sage Patent Group

(57) ABSTRACT

Method for handling synchronization of a wireless device (130). The first network node (111) and the wireless device (130) operate in a wireless communications network (100). The first network node (111) determines (202) whether or not the wireless device (130) requires synchronization, during a first time period, with a second network node (112) serving the wireless device (130). The determining (202) is based on a prediction of at least one of: a) data communication between the wireless device (130) and the second network node (112) during the first time period, and b) the wireless device (130) lacking synchronization during the first time period. The first network node (111) initiates (203), based on a result of the determination, a synchronization procedure of the wireless device (130) during a second time period. The second time period precedes the first time period, so that the synchronization procedure is completed prior to the first time period.

20 Claims, 14 Drawing Sheets

(51) Int. Cl.
*H04W 72/04* (2009.01)
*H04W 88/06* (2009.01)

(58) Field of Classification Search
USPC .......................................................... 370/329
See application file for complete search history.

(56) References Cited

U.S. PATENT DOCUMENTS

| | | | |
|---|---|---|---|
| 2013/0223307 A1* | 8/2013 | Ohlsson | H04W 52/0216 370/311 |
| 2016/0191229 A1* | 6/2016 | Matsunaga | H04W 56/001 370/503 |

FOREIGN PATENT DOCUMENTS

| | | |
|---|---|---|
| WO | 2015178835 A1 | 11/2015 |
| WO | 2016048067 A2 | 3/2016 |
| WO | 2017091115 A1 | 6/2017 |

OTHER PUBLICATIONS

Unknown, Author, "3rd Generation Partnership Project; Technical Specification Group Services and System Aspects; Service aspects; Service principles (Release 15)", 3GPP TS 22.101 V15.1.0, Jun. 2017, pp. 1-100.

Unknown, Author, "3rd Generation Partnership Project; Technical Specification Group Services and System Aspects; Study on Architecture for Next Generation System (Release 14)", 3GPP TR 23.799 V1.1.0, Oct. 2016, pp. 1-280.

Unknown, Author, "Discussion on multiple access for New Radio systems", 3GPP TSG-RAN WGl Meeting #84bis; R1-162922; Busan, Korea,, Apr. 11-15, 2016, pp. 1-4.

\* cited by examiner

METHODS AND APPARATUSES FOR HANDLING SYNCHRONIZATION OF A WIRELESS DEVICE

TECHNICAL FIELD

The present disclosure relates generally to a first network node and methods performed thereby for handling synchronization of a wireless device. The present disclosure relates generally as well to a second network node and methods performed thereby for handling synchronization of a wireless device. The present disclosure relates generally also to a third network node and methods performed thereby for handling synchronization of a wireless device. The present disclosure further relates to computer program products, comprising instructions to carry out the actions described herein, as performed by the first network node, the second network node, and the third network node. The computer program products may be stored on computer-readable storage mediums.

BACKGROUND

Wireless devices within a wireless communications network may be e.g., stations (STAs), User Equipments (UEs), Fifth Generation (5G) UE, mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g. between two wireless devices, between a wireless device and a regular telephone, and/or between a wireless device and a server via a Radio Access Network (RAN), and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The wireless communications network covers a geographical area which may be divided into cell areas, each cell area being served by a network node or Transmission Point (TP), for example, an access node such as a Base Station (BS), e.g. a Radio Base Station (RBS), which sometimes may be referred to as e.g., gNB, evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The wireless communications network may also be a non-cellular system, comprising network nodes which may serve receiving nodes, such as wireless devices, with serving beams.

In the context of this disclosure, the expression Downlink (DL) is used for the transmission path from the base station to the wireless device. The expression Uplink (UL) is used for the transmission path in the opposite direction i.e., from the wireless device to the base station.

The standardization organization 3rd Generation Partnership Project (3GPP) is currently in the process of specifying a New Radio Interface called New Radio (NR) or 5G-Universal Terrestrial Radio Access (UTRA), as well as a 5G Packet Core Network, which may be referred to as Next Generation Core Network, abbreviated as NG-CN, NGC or 5G CN. The current understanding of various concepts related to this work may be based on input from 3GPP TS 23.799 v1.1.0.

The 5G RAN may comprise base stations supporting evolved Long Term Evolution (LTE) and/or NR radio access. In 5G RAN, base stations, which may be referred to as gNB, NR BS, eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

In LTE, when a UE wants to connect to a cell, it may need to perform a Random Access (RA) procedure. A random access signal may then be sent in a contention-based manner and over the Physical Random Access Channel (PRACH). Which resources to use may be specified in System Information Broadcast 2 (SIB-2), as part of the system information. The UE may select a random access preamble at random from a certain subset, where the total number of sequences may be 64, and may transmit it over the PRACH. If the base station identifies the reception of a random access sequence, it may reply over a DownLink Shared CHannel (DL-SCH) with a message containing the index of the sequence, its timing correction, a scheduling grant and a temporary identity, Temporary Cell Radio Network Temporary Identifier (TC-RNTI). When receiving this message, the UE may respond with a terminal identification needed for further communication, which makes it possible for the UE to connect to the system.

The random-access procedure may also be used in other cases, such as when the UE is Radio Resource Control Connected mode (RRC_CONNECTED) and data arrives, but the UE is not synchronized in the uplink.

Ultra-Reliable and Low-Latency Communications (URLLC) Service

One of the cornerstone requirements for 5G/NR is Ultra-Reliable and Low Latency Communication (URLLC). URLLC was one of cases defined in TR 22.862 V14.1.0. In URLLC, both reliability of communication and low latency were highly demanded. It may be noted that these requirements are mutually conflicting. Usually, the two aspects may be traded for each other, that is, it may be relatively easy to achieve one aspect by trading-off the other, while for URLLC both should be met simultaneously, which poses a remarkable challenge to User-Plane (UP) design.

The low network latency may be required for the 5G applications, such as the tactile Internet and augmented reality, which may need extremely low latency, less than 1 millisecond (ms). According to 3GPP TR 22.862 V14.1.0, the latency requirements for URLLC range from 1 ms to 10 ms for different concrete applications, ranging from automation applications, smart grid to intelligent transportation, and reliability from a residual error rate of $10^{-4}$, $10^{-6}$, to $10^{-9}$. It may be noted that such residual error rate calculation should regard packets sent later than the demanded latency bound such as 1 ms or 10 ms as errors or invalid in the context of URLLC. That is, the latency may need to be below the latency restriction, otherwise the packets may be regarded as an error. Moreover, the reduced latency may need to be fulfilled without substantially increasing the energy consumption.

Simultaneously achieving such high demands on both reliability and latency may impact many layers and components of both Radio Access Network (RAN) and core network. URLLC may be regarded as an extremely high Quality of Service (QoS) use case both in RAN and core network.

Existing methods in LTE for data transmission by a wireless device, however, may result in delays and therefore errors in URLLC.

SUMMARY

It is an object of embodiments herein to improve the handling of communications by a wireless device in a wireless communications network. It is a particular object of the embodiments herein to improve latency of data communications in a wireless communications network. It is a further particular object of the embodiments herein to improve the handling of synchronization of a wireless device in a wireless communications network.

According to a first aspect of embodiments herein, the object is achieved by a method, performed by a first network node. The method is for handling synchronization of a wireless device. The first network node and the wireless device operate in a wireless communications network. The first network node determines whether or not the wireless device requires synchronization during a first time period. The synchronization is with a second network node serving the wireless device. The determining is based on a prediction of at least one of: a) data communication between the wireless device and the second network node during the first time period, and b) the wireless device lacking synchronization during the first time period. The first network node then initiates, based on a result of the determination, a synchronization procedure of the wireless device with the second network node during a second time period. The second time period precedes the first time period, so that the synchronization procedure is completed prior to the first time period.

According to a second aspect of embodiments herein, the object is achieved by a method, performed by a third network node. The method is for handling synchronization of the wireless device. The third network node and the wireless device operate in the wireless communications network. The third network node obtains the prediction of the wireless device lacking synchronization, during the first time period, with the second network node serving the wireless device. The third network node then initiates providing an indication of the obtained prediction to the first network node operating in the wireless communications network. The initiating is performed before the second time period, the second time period preceding the first time period, so that the synchronization procedure is enabled to be completed prior to the first time period.

According to a third aspect of embodiments herein, the object is achieved by a method, performed by the second network node. The method is for handling the synchronization of the wireless device. The second network node is serving the wireless device. The second network node and the wireless device operate in the wireless communications network. The second network node obtains, from the first network node operating in the wireless communications network, an instruction to command the wireless device to synchronize with the second network node. The obtaining is based on the result of a determination of whether or not the wireless device requires synchronization, during the first time period, with the second network node. The obtaining is further based on the prediction of at least one of: a) data communication between the wireless device and the second network node during the first time period, and b) the wireless device lacking synchronization during the first time period. The second network node initiates, based on the obtained instruction, commanding the wireless device to synchronize with the second network node during the second time period. The second time period precedes the first time period, so that the synchronization procedure is completed prior to the first time period.

According to a fourth aspect of embodiments herein, the object is achieved by the first network node. The first network node is configured to handle the synchronization of the wireless device. The first network node and the wireless device are configured to operate in the wireless communications network. The first network node is further configured to determine whether or not the wireless device requires synchronization, during the first time period, with the second network node. The second network node is configured to serve the wireless device. To determine is configured to be based on a prediction of at least one of: a) data communication between the wireless device and the second network node during the first time period, and b) the wireless device lacking synchronization during the first time period. The second network node initiates, based on the result of the determination, the synchronization procedure of the wireless device with the second network node during the second time period. The second time period is configured to precede the first time period, so that the synchronization procedure is completed prior to the first time period.

According to a fifth aspect of embodiments herein, the object is achieved by the third network node configured to handle the synchronization of the wireless device. The third network node and the wireless device are configured to operate in the wireless communications network. The third network node is further configured to obtain the prediction of the wireless device lacking synchronization, during the first time period, with the second network node. The second network node is configured to serve the wireless device. The third network node initiates providing the indication of the prediction configured to be obtained to the first network node configured to operate in the wireless communications network. To initiate is configured to be performed before the second time period. The second time period is configured to precede the first time period, so that the synchronization procedure is enabled to be completed prior to the first time period.

According to a sixth aspect of embodiments herein, the object is achieved by the second network node configured to handle the synchronization of the wireless device. The second network node is configured to serve the wireless device. The second network node and the wireless device are configured to operate in the wireless communications network. The second network node is further configured to obtain, from the first network node configured to operate in the wireless communications network, the instruction to command the wireless device to synchronize with the second network node. To obtain is configured to be based on the result of the determination of whether or not the wireless device requires synchronization, during the first time period, with the second network node. To obtain is further configured to be based on the prediction of at least one of: a) data communication between the wireless device and the second network node during the first time period, and b) the wireless device lacking synchronization during the first time period. The second network node is further configured to initiate, based on the instruction configured to be obtained, commanding the wireless device to synchronize with the second network node during the second time period. The second time period is configured to precede the first time period, so that the synchronization procedure is completed prior to the first time period.

According to a seventh aspect of embodiments herein, the object is achieved by a first network node operative to handle the synchronization of the wireless device. The first network node and the wireless device are operative to operate in the wireless communications network. The first network node comprises a processing circuitry and a memory. Said memory contains instructions executable by said processing circuitry, whereby the first network node is further operative to first, determine whether or not the wireless device requires synchronization, during the first time period, with the second network node operative to serve the wireless device. To determine is based on a prediction of at least one of: a) data communication between the wireless device and the second network node during the first time period, and b) the wireless device lacking synchronization during the first time period. The first network node is further operative to second, initiate, based on a result of the determination, a synchronization procedure of the wireless device with the second network node during the second time period, the second time period preceding the first time period, so that the synchronization procedure is completed prior to the first time period.

According to an eighth aspect of embodiments herein, the object is achieved by a third network node operative to handle the synchronization of the wireless device. The third network node and the wireless device are operative to operate in the wireless communications network. The third network node comprises a processing circuitry and a memory. Said memory contains instructions executable by said processing circuitry, whereby the third network node is further operative to a) obtain the prediction of the wireless device lacking synchronization, during the first time period, with a second network node operative to serve the wireless device. The third network node is further operative to b) initiate providing the indication of the obtained prediction to a first network node operative to operate in the wireless communications network. To initiate is performed before the second time period, the second time period preceding the first time period, so that the synchronization procedure is enabled to be completed prior to the first time period.

According to a ninth aspect of embodiments herein, the object is achieved by a second network node operative to handle synchronization of a wireless device. The second network node is operative to serve the wireless device. The second network node and the wireless device are operative to operate in a wireless communications network. The second network node comprises a processing circuitry and a memory. Said memory contains instructions executable by said processing circuitry, whereby the second network node is further operative to first, obtain, from the first network node operative to operate in the wireless communications network, the instruction to command the wireless device to synchronize with the second network node. To obtain is based on the result of the determination of whether or not the wireless device requires synchronization, during the first time period, with the second network node. To obtain is further based on the prediction of at least one of: a) data communication between the wireless device and the second network node during the first time period, and b) the wireless device lacking synchronization during the first time period. The second network node is further configured to initiate, based on the obtained instruction, commanding the wireless device to synchronize with the second network node during the second time period, the second time period preceding the first time period, so that the synchronization procedure is completed prior to the first time period.

According to a tenth aspect of embodiments herein, the object is achieved by a first network node configured to handle synchronization of a wireless device. The first network node and the wireless device are configured to operate in the wireless communications network. The first network node comprises a determining module configured to determine whether or not the wireless device requires synchronization, during the first time period, with the second network node configured to serve the wireless device. To determine is configured to be based on the prediction of at least one of: a) data communication between the wireless device and the second network node during the first time period, and b) the wireless device lacking synchronization during the first time period. The first network node also comprises an initiating module configured to initiate, based on the result of the determination, the synchronization procedure of the wireless device with the second network node during the second time period, the second time period being configured to precede the first time period, so that the synchronization procedure is completed prior to the first time period.

According to an eleventh aspect of embodiments herein, the object is achieved by a third network node configured to handle the synchronization of the wireless device. The third network node and the wireless device are configured to operate in the wireless communications network. The third network node comprises an obtaining module configured to obtain the prediction of the wireless device lacking synchronization, during the first time period, with the second network node configured to serve the wireless device. The third network node also comprises an initiating module configured to initiate providing the indication of the prediction configured to be obtained to the first network node configured to operate in the wireless communications network. To initiate is configured to be performed before the second time period, the second time period being configured to precede the first time period, so that the synchronization procedure is enabled to be completed prior to the first time period.

According to a twelfth aspect of embodiments herein, the object is achieved by a second network node configured to handle the synchronization of the wireless device. The second network node is configured to serve the wireless device. The second network node and the wireless device are configured to operate in the wireless communications network. The second network node comprises an obtaining module configured to obtain, from the first network node configured to operate in the wireless communications network, the instruction to command the wireless device to synchronize with the second network node. To obtain is configured to be based on the result of the determination of whether or not the wireless device requires synchronization, during the first time period, with the second network node. To obtain is further configured to be based on the prediction of at least one of: a) data communication between the wireless device and the second network node during the first time period, and b) the wireless device lacking synchronization during the first time period. The second network node also comprises an initiating module configured to initiate, based on the instruction configured to be obtained, commanding the wireless device to synchronize with the second network node during the second time period, the second time period being configured to precede the first time period, so that the synchronization procedure is completed prior to the first time period.

According to a thirteenth aspect of embodiments herein, the object is achieved by a computer program. The computer program comprises instructions which, when executed on at least one processing circuitry, cause the at least one processing circuitry to carry out the method performed by the first network node.

According to a fourteenth aspect of embodiments herein, the object is achieved by a computer-readable storage medium. The computer-readable storage medium has stored thereon a computer program comprising instructions which, when executed on at least one processing circuitry, cause the at least one processing circuitry to carry out the method performed by the first network node.

According to a fifteenth aspect of embodiments herein, the object is achieved by a computer program. The computer program comprises instructions which, when executed on at least one processing circuitry, cause the at least one processing circuitry to carry out the method performed by the third network node.

According to a sixteenth aspect of embodiments herein, the object is achieved by a computer-readable storage medium. The computer-readable storage medium has stored thereon a computer program comprising instructions which, when executed on at least one processing circuitry, cause the at least one processing circuitry to carry out the method performed by the third network node.

According to a seventeenth aspect of embodiments herein, the object is achieved by a computer program. The computer program comprises instructions which, when executed on at least one processing circuitry, cause the at least one processing circuitry to carry out the method performed by the second network node.

According to an eighteenth aspect of embodiments herein, the object is achieved by a computer-readable storage medium. The computer-readable storage medium has stored thereon a computer program comprising instructions which, when executed on at least one processing circuitry, cause the at least one processing circuitry to carry out the method performed by the network node.

By determining, based on the prediction, whether or not the wireless device requires synchronization, during the first time period, with the second network node, the first network node is enabled to initiate, based on the result of the determination, the synchronization procedure of the wireless device during the second time period. Because the second time period precedes the first time period sufficiently, so that the synchronization procedure is enabled to be completed prior to the first time period, a probability of uplink synchronization with the second network node during the first time period in significantly increased, without performing unnecessary signalling. The unnecessary signalling is avoided because the synchronization procedure may only be performed when necessary, that is, when the wireless device may have data to communicate during the first time period, and/or when the wireless device is likely to lack synchronization during the second time period. Another further advantage of embodiments herein is that they allow to reduce added delay due to uplink synchronization. This is because the synchronization procedure is enabled to be performed and completed prior to data transmission, and not upon data arrival. The third network node enables the foregoing by obtaining the prediction of the wireless device lacking synchronization with the second network node during the first time period. The second network node enables the named advantages by instructing the wireless device to initiate the synchronization procedure according to the determination of the first network node.

BRIEF DESCRIPTION OF THE DRAWINGS

Examples of embodiments herein are described in more detail with reference to the accompanying drawings, and according to the following description.

DETAILED DESCRIPTION

Figure 1:
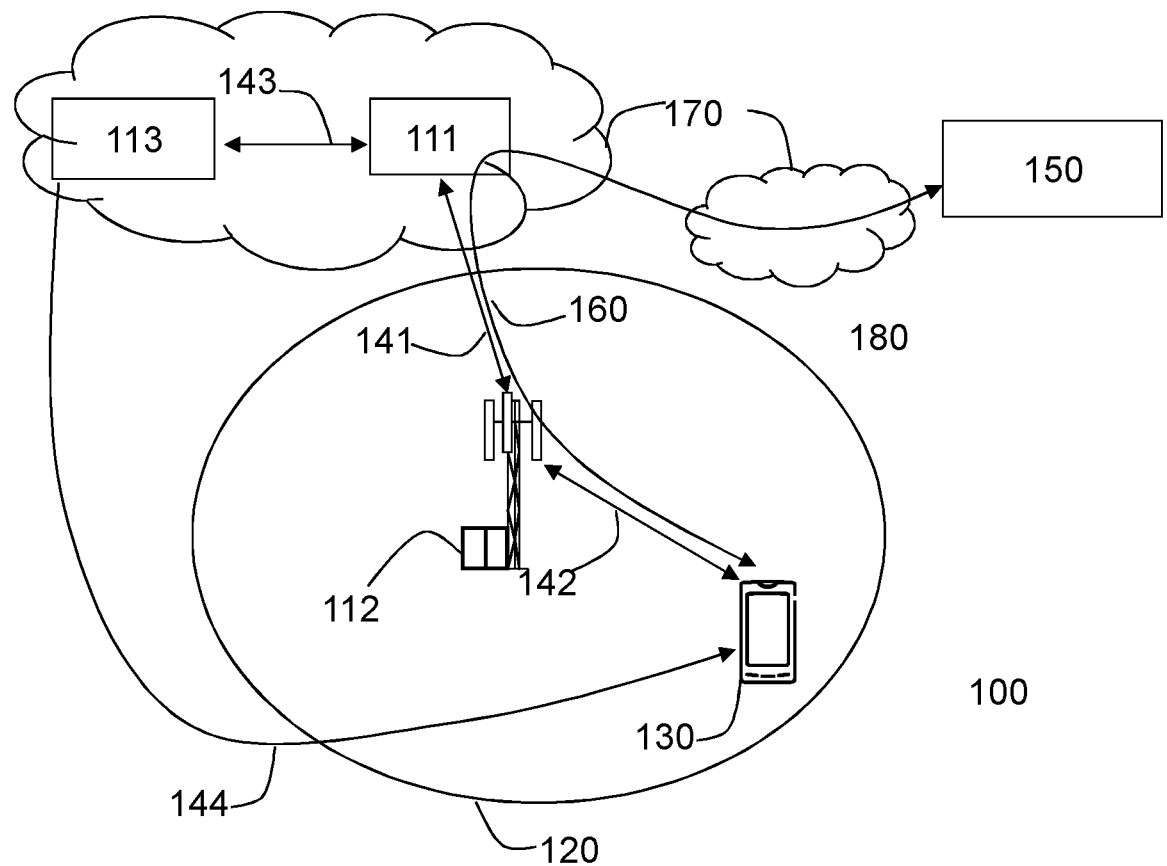
FIG. 1 is a schematic representation illustrating an example of a wireless communications network, according to embodiments herein.

As part of the development of the embodiments disclosed herein, a problem associated with existing methods will first be identified and discussed.

In delay critical applications, such as those of NR wherein URLLC may apply, it may be important for a wireless device to not lose uplink synchronization just before or during arrival of data. Otherwise, the wireless device may have to synchronize the uplink again prior to uplink transmission, which increases the delay even further. One approach to this problem is to force the wireless device to perform synchronization if no uplink transmission has taken place within a certain time window, but such a solution may lead to a large increase of signaling and interference, as the uplink synchronization may not be needed. Furthermore, increased signaling leads to higher energy consumption at the network, the wireless device, or both.

Embodiments herein address the foregoing problems of the existing methods by enabling synchronization of uplink prior to data arrival. As a summarized overview, embodiments herein may be understood to relate to reduce the latency of communications in a wireless communications network without unnecessary signaling, by predicting when a wireless device may be going to receive and/or transmit data, and by predicting whether an uplink synchronization procedure of the wireless device may be needed.

Embodiments herein may be understood to be based on prediction models built using machine learning. Machine learning has experienced a large growth thanks to the recent years of publicity, new algorithms, more powerful hardware, and the possibility to handle, store and process large amounts of data. Machine learning may typically build a prediction model based on historical data, and may be particularly useful when no obvious relation may reside between the historical data, that is, the input, and what is predicted, the output. With a prediction model, the probability of data arriving in the downlink/uplink may be estimated. A prediction model may also be used to estimate the probability of a wireless device not being synchronized in the uplink.

As a summarized overview, some embodiments herein may be understood to use prediction of data arrival to find out when synchronization may be needed at a future time, and also to make sure that the synchronization is completed before it may be needed. Some embodiments herein may be understood to use prediction to find out when a wireless device may be likely to need uplink synchronization. With the use of such prediction, the synchronization may be performed on a need basis, without explicitly knowing the synchronization error. The two groups of embodiments may be combined to perform synchronization before arrival and/or transmission of data when the wireless device may have a need for synchronization.

Embodiments will now be described more fully hereinafter with reference to the accompanying drawings, in which examples are shown. In this section, the embodiments herein will be illustrated in more detail by a number of exemplary embodiments. It should be noted that the exemplary embodiments herein are not mutually exclusive. Components from one embodiment may be tacitly assumed to be present in another embodiment and it will be obvious to a person skilled in the art how those components may be used in the other exemplary embodiments.

FIG. 1 depicts two non-limiting example of a wireless communications network 100, sometimes also referred to as a wireless communications system, cellular radio system, or cellular network, in which embodiments herein may be implemented. The wireless communications network 100 may typically be a 5G system, 5G network, or Next Gen System or network, or a Long-Term Evolution (LTE), e.g. LTE Frequency Division Duplex (FDD), LTE Time Division Duplex (TDD), LTE Half-Duplex Frequency Division Duplex (HD-FDD), LTE operating in an unlicensed band. The wireless communications network 100 may support other technologies such as, for example, Wideband Code Division Multiple Access (WCDMA), Universal Terrestrial Radio Access (UTRA) TDD, Global System for Mobile Communications (GSM) network, Enhanced Data rates for GSM Evolution (EDGE) network, GSM EDGE Radio Access Network (GERAN), Ultra-Mobile Broadband (UMB), network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), or any cellular network or system. Thus, although terminology from 5G/NR and LTE may be used in this disclosure to exemplify embodiments herein, this should not be seen as limiting the scope of the embodiments herein to only the aforementioned system. The wireless communications network may also be understood as a non-cellular system, comprising network nodes which may serve receiving nodes, such as wireless devices, with serving beams. This may be a typical case, e.g., a in a 5G network.

The wireless communications network 100 comprises a plurality of network nodes whereof a first network node 111, a second network node 112 and a third network node 113 are depicted in FIG. 1.

Any of the first network node 111, the second network node 112 and the third network node 113 may be a radio network node, such as e.g., a gNB, a base station, an eNB, eNodeB, or a Home Node B, a Home eNodeB, femto Base Station, BS, a Transmission Point (TP), Radio Access Point, Remote Radio Unit (RRU), Remote Radio Head (RRH), or any other network unit capable to serve a wireless device or a machine type node in the wireless communications network 100. In such embodiments, any of the first network node 111, the second network node 112, and the third network node 113 may be e.g., a Wide Area Base Station, Medium Range Base Station, Local Area Base Station and Home Base Station, based on transmission power and thereby also coverage size. Any of the first network node 111, the second network node 112, and the third network node 113 may be a stationary relay node or a mobile relay node. Any of the first network node 111, the second network node 112, and the third network node 113 may support one or several communication technologies, and their name may depend on the technology and terminology used. In some non-limiting examples, any of the first network node 111, the second network node 112, and the third network node 113 may serve receiving nodes with serving beam-formed beams, which may also be referred to herein simply as beams. In some embodiments, any of the first network node 111, the second network node 112, and the third network node 113 may correspond to any type of radio network node or any network node, which communicates with another radio network node or wireless device. Any of the first network node 111, the second network node 112, and the third network node 113 may be directly connected to one or more networks and/or one or more core networks.

Any of the first network node 111, the second network node 112 and the third network node 113 may be implemented as one or more distributed nodes, one or more of which may be a virtual nodes in the cloud. In some examples, any of the first network node 111, the second network node 112, and the third network node 113 may be co-localized, partly co-localized, or be the same network node.

Typically, the first network node 111 and the second network node 112 may be radio network nodes. In particularly typical embodiments, the first network node 111 and the second network node 112 may be the same node. Also in typical embodiments, the third network node 113 may be a core network node, e.g., a Mobility Management Entity (MME), Self-Organizing Network (SON) node, a coordinating node, MDT node, etc. . . . , or even an external node e.g., 3rd party node, or a node external to the current network. In the particular non-limiting example of FIG. 1, the first network node 111, the second network node 112, and the third network node 113 are implemented as a distributed node system, wherein each of the first network node 111 and the third network node 113 are implemented as a network node in the cloud, whereas the second network node 112 is a radio network node.

The wireless communications network 100 covers a geographical area which may be divided into cell areas, wherein each cell area may be served by a network node, although, one radio network node may serve one or several cells. The wireless communications network 100 may comprise a cell 120. In the non-limiting example depicted in FIG. 1, the second network node 112 serves the cell 120. Even in examples wherein the wireless communications network 100 may not be referred to as a cellular system, if the radio network nodes may serve receiving nodes, such as wireless devices, with serving beams, the areas of coverage of the beams may still be referred to as cells.

A plurality of wireless devices may be located in the wireless communication network 100, whereof a wireless device 130, is depicted in the non-limiting example of FIG. 1. The wireless device 130 in the wireless communications network 100 may be a wireless communication device such as a 5G UE, or a UE, which may also be known as e.g., mobile terminal, wireless terminal and/or mobile station, mobile telephone, cellular telephone, or laptop with wireless capability, or a Customer Premises Equipment (CPE), just to mention some further examples. The wireless device 130 in the present context may be, for example, portable, pocket-storable, hand-held, computer-comprised, or a vehicle-mounted mobile device, enabled to communicate voice and/or data, via a RAN, with another entity, such as a server, a laptop, a Personal Digital Assistant (PDA), or a tablet computer, sometimes referred to as a tablet with wireless capability, or simply tablet, a Machine-to-Machine (M2M) device, a device equipped with a wireless interface, such as a printer or a file storage device, modem, Laptop Embedded Equipped (LEE), Laptop Mounted Equipment (LME), USB dongles, or any other radio network unit capable of communicating over a radio link in the wireless communications network 100. The wireless device 130 may be wireless, i.e., it may be enabled to communicate wirelessly in the wireless communication network 100 and, in some particular examples, may be able support beamforming transmission. The communication may be performed e.g., between two devices, between a device and a network node, and/or between a device and a server. The communication may be performed e.g., via a RAN and possibly one or more core networks, comprised within the wireless communications network 100. In a typical scenario, the second network node 112 may be a base station serving the wireless device 130, as depicted in FIG. 1.

The first network node 111 may be configured to communicate within the wireless communications network 100 with the second network node 112 over a first link 141, e.g., a radio link or a wired link. The second network node 112 may be configured to communicate within the wireless communications network 100 with the wireless device 130 over a second link 142, e.g., a radio link. The first network node 111 may be configured to communicate within the wireless communications network 100 with the third network node 113 over a third link 143, e.g., a radio link or a wired link. The third network node 113 may be configured to communicate within the wireless communications network 100 with the wireless device 130 over a fourth link 144, e.g., a radio link. It may be noted that in the non-limiting example of FIG. 1, each of the first link 141, the second link 142 and the third link 143 is represented as a direct link. However, it may be noted that the communication between the first network node 111, the second network node 112, the third network node 113, and the wireless device 130 may take place via one or more other radio network nodes or core network nodes, as pertinent.

In some embodiments, the wireless communications network 100 may be connected to a host computer 150, as depicted in the example of FIG. 1. The host computer 150 may be embodied in the hardware and/or software of a standalone server, a cloud-implemented server, a distributed server or as processing resources in a server farm. The host computer 150 may be under the ownership or control of a service provider, or may be operated by the service provider or on behalf of the service provider. The host computer 150 may communicate with the wireless device 130 via a fifth link 160. The fifth link 160 may comprise one or more wired and wireless links, and extend via, e.g., the cloud 170, the one or more other radio network nodes or core network nodes in the wireless communications network 100. In some examples, the fifth link 160 may extend via an optional intermediate network, which is not depicted in FIG. 1 to simplify the Figure. The intermediate network may be one of, or a combination of more than one of, a public, private or hosted network; the intermediate network may be a backbone network or the Internet. A connectivity provided by the fifth link 160 may be referred to as an Over the Top (OTT) connection.

The system comprising the host computer 150, and at least one of the network node 111, the second network node 112, the third network node 113, and the wireless device 130 may be referred to herein as a telecommunications system 180.

In general, the usage of "first", "second", and/or "third", "fourth" and "fifth" herein may be understood to be an arbitrary way to denote different elements or entities, and may be understood to not confer a cumulative or chronological character to the nouns they modify.

Embodiments of a method, performed by the first network node 111, for handling synchronization of the wireless device 130, will now be described with reference to the flowchart depicted depicted in FIG. 2. The first network node 111 and the wireless device 130 operate in the wireless communications network 100.

The method may comprise the actions described below. In some embodiments all the actions may be performed. One or more embodiments may be combined, where applicable. All possible combinations are not described to simplify the description. In FIG. 2, an optional action is indicated with dashed lines.

Action 201

In order to reduce the latency of communications in the wireless communications network 100 without unnecessary signalling, the first network node 111 may make sure that the wireless device 130 is synchronized in the uplink prior to data arrival, when the wireless device 130 may need to be synchronized with the second network node 112, which is serving the wireless device 130. In accordance with this, in this Action 201, the first network node 111 may first obtain an indication of a prediction. The prediction may be understood herein as a mathematical prediction, as will be described later. The prediction may be understood to be of whether the wireless device 130 may be expected to communicate data to or from the second network node 112 during a particular time, whether the wireless device 130 may be expected to have lost synchronization with the second network node 112 during a particular time, or both. In other words, the prediction is of at least one of: a) data communication between the wireless device 130 and the second network node 112 during a first time period, that is, a particular period of time, in the future, and b) the wireless device 130 lacking synchronization during the first time period. The first time period may be understood to be a configurable parameter that may be set by e.g., an operator of the wireless communications network 100. The first time period may be, for example, a particular radio frame having a duration 10 ms at a time x, e.g., T1 starting 1000 ms later, or a particular subframe with 1 ms duration at a time y, e.g., T2 starting 500 ms later.

Obtaining in this Action 201 may be understood as determining or calculating itself, retrieving from a memory, or receiving or fetching from another node in the wireless communications network 100. That is, the obtaining in this Action 201 of the indication of the prediction may be performed autonomously by the first network node 111, or obtained from the third network node 113 operating in the wireless communications network 100. Typically, the calculation of the prediction may be performed by the third network node 113 in, e.g., the core network, and the first network node 111 may obtain the indication by receiving it, e.g., via the third link 143.

The prediction, according to embodiments herein may be understood to be based on one or more prediction models built using machine learning. With a prediction model, it may be possible for a network node such as the first network node 111 to estimate the probability of data arriving in the downlink/uplink. It may for example be the probability of data arriving during the first time period, e.g., within time "T", or data received within a frame T1 and T2.

The prediction may be based on the history of data communication, namely transmissions and/or receptions of the wireless device 130, or another wireless device, for example by using any of the following inputs: a) packet inter arrival time, e.g., standard deviation, average . . . , b) number of packets up/down, c) total bytes up/down, d) packet sizes, e) time since last packet, f) packet protocols, e.g., http, voice, etc. . . . , g) manufacturer of the wireless device 130, etc. . . .

A prediction model may also be used to estimate the probability of the wireless device 130 not being synchronized in the uplink during the first time period, or during a second time period, that is another time period, preceding the first time period. The second time period may be understood as a period of time when e.g., the first network node 111, or another network node, may check whether the wireless device 130 may need to be synchronized. The first time period and the second time period may be understood to be different and disjoint, that is, not-overlapping. In some particular embodiments, the second time period may be understood to end before the beginning of the first time period. The second time period may precede the first time period sufficiently enough for the need of synchronization to be tested, and a synchronization procedure of the wireless device 130 with the second network node 112 to be performed and completed before the beginning of the first time period. In some embodiments, an end of the second time period may precede a beginning of the first time period, e.g., by less than ten seconds. The first time period may comprise one or more first subframes. The second time period may comprise one or more second subframes.

The inputs to the model may be data related to the wireless device 130, such as historical position data, that is, trajectory, velocity of the wireless device 130 it may be moving at, device type of the wireless device 130, the manufacturer of the wireless device 130, etc. . . . . The input may also be data related to the wireless communications network 100, such as, the environment characteristics. For example, if the wireless communications network 100 is deployed in a high scattering environment such as a dense urban city, the wireless device 130 may be more likely to end up out-of-sync faster, in comparison with a rural scenario. Other data related to the wireless communications network 100 may be historical data on the synchronization of the wireless device 130, and/or of other wireless devices in the wireless communications network 100. For example, historic data of the time durations when the wireless device 130, and/or of other wireless devices in the wireless communications network 100 lose synchronization, and previous timing calibrations.

Before the models just described may be used, they may need to be trained with data. This may be done by collecting data from a real network, e.g., the wireless communications network 100, or from a simulated network, thus learning, based on certain inputs, whether the wireless device 130 may have uplink synchronization, and/or when data may be expected to arrive, in the downlink, or in the uplink. The models may also be trained while using them. That is, as more data is obtained, the models may be further trained, and the prediction may become more accurate.

When combining the data arrival prediction and the uplink synchronization prediction, the first network node 111 may enable to avoid unnecessary synchronizations by making sure that they are only performed when data arrival is expected and the wireless device 130 may likely be out of synchronization.

According to the foregoing, the prediction may be a mathematical estimation based on one or more computer-derived mathematical models. The one or more computer-derived mathematical models may have been derived and updated in an automated process, e.g., machine learning, based on at least one of: a) historical data on data communication by the wireless device 130 or by another wireless device; b) simulated data on data communication by the wireless device 130 or by another wireless device; and c) one or more characteristics of an environment of the data communication by the wireless device 130 before one of: the first time period and the second time period.

The indication of the prediction may be, e.g., a message comprising a result of the prediction. The result of the prediction may be, for example, a probability that data will arrive within time T, or between time T1 and T2.

The prediction of the data communication between the wireless device 130 and the second network node 112 during the first time period may be performed, for example, according to methods described in WO 2017/091115.

Further details of how the prediction of the wireless device 130 lacking synchronization during the first time period may be performed, are provided below, in relation to the method performed by the third network node 113.

Action 202

Once the first network node 111 may have obtained the indication of the prediction, in this Action 202, the first network node 111 determines whether or not the wireless device 130 requires synchronization, during the first time period, with the second network node 112 serving the wireless device 130. The determining in this Action 202 is based on the prediction of at least one of: a) data communication between the wireless device 130 and the second network node 112 during the first time period, and b) the wireless device 130 lacking synchronization during the first time period.

Determining may be understood as calculating, or analyzing, e.g., according to an "if z, then w" criterion.

That the determining in this Action 202 is based on the prediction may comprise one of the following outcomes. A first outcome may be that the data communication between the wireless device 130 and the second network node 112 is predicted to occur during the first time period, and the result of the determination is that the wireless device 130 requires synchronization with the second network node 112 during the first time period. A second outcome may be that the data communication between the wireless device 130 and the second network node 112 is predicted to not occur during the first time period, and the result of the determination is that the wireless device 130 does not require synchronization with the second network node 112 during the first time period. A third outcome may be that the wireless device 130 is predicted to lack synchronization with the second network node 112 during the first time period, and the result of the determination is that the wireless device 130 requires synchronization with the second network node 112 during the first time period. A fourth outcome may be that the wireless device 130 is predicted to be synchronized with the second network node 112 during the first time period, and the result of the determination is that the wireless device 130 does not require synchronization with the second network node 112 during the first time period.

Action 203

Finally, in this Action 203, the first network node 111 initiates, based on a result of the determination in Action 202, a synchronization procedure of the wireless device 130 with the second network node 112 during the second time period, the second time period preceding the first time period, so that the synchronization procedure is completed prior to the first time period. That is, as stated earlier, the second time period precedes the first time period, or gets started sufficiently in advance of the beginning of the first time period, to ensure that the synchronization procedure may be completed prior to the first time period and that the wireless device 130 may be synchronized with the second network node 112 during at the beginning of the first time period. This way, the synchronization that may be needed for data communication between the wireless device 130 and the second network node 112 during the first time period may be enabled. Communication herein may be understood to comprise any of reception and transmission, or both.

Initiating may be understood as, e.g., beginning or triggering.

The synchronization procedure may be called differently depending on the RAT used. For example, in LTE, the synchronization procedure may be, e.g., the command to perform synchronization in uplink, followed by a transmission of a random access preamble in the uplink followed by a timing correction in the downlink. Synchronization may be understood as a negative time offset compared to the downlink signals in order to get the arrival timing of the uplink correct such that they may be received within an expected time frame and not cause interference to succeeding subframes. This may be understood to be due to a time it may take for the radio signals to travel between a transmitter and a receiver. The synchronization procedure may be understood to be completed when the wireless device 130 has been updated with a timing offset such that the uplink data arrives within the expected time frame.

According to the foregoing, the result of the determination may be that the wireless device 130 requires synchronization during the first time period, and the synchronization procedure is initiated.

In other cases, the result of the determination may be that the wireless device 130 does not require synchronization during the first time period, and the initiation of the synchronization procedure may therefore be avoided. Unnecessary signalling, computational resources, and energy resources to perform the synchronization procedure may therefore be saved.

The initiating, in this Action 203, of the synchronization procedure of the wireless device 130 with the second network node 112 may comprise providing, to the second network node 112, an instruction to command the wireless device 130 to synchronize with the second network node 112. The instruction may be for example a Random Access Request message. The providing may be performed, e.g., via the first link 141, which may be a wired link, in embodiments wherein the first network node 111 and the second network node 112 may be the same node, or a radio link, in embodiments wherein they may be different or distributed nodes.

Figure 3:
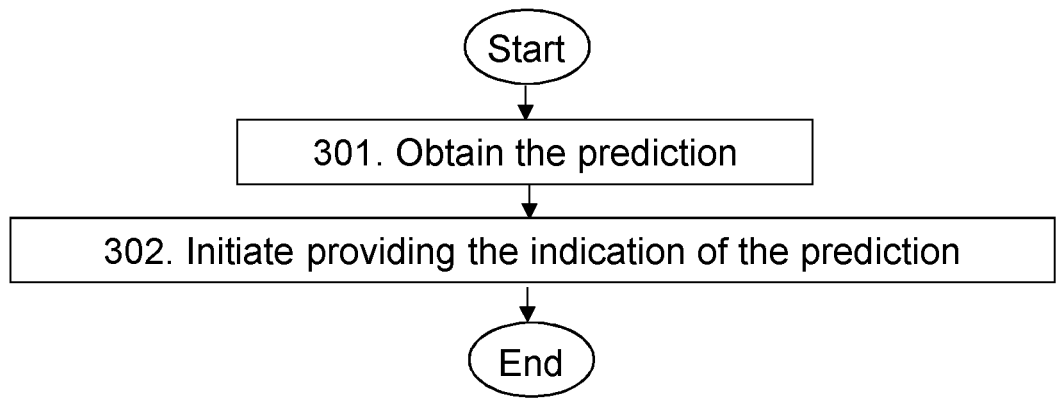
FIG. 3 is a flowchart depicting embodiments of a method in a third network node, according to embodiments herein.

Embodiments of a method, performed by the third network node 113, for handling synchronization of the wireless device 130, will now be described with reference to the flowchart depicted depicted in FIG. 3. As stated earlier, the third network node 113 and the wireless device 130 operate in the wireless communications network 100.

The detailed description of some of the following corresponds to the same references provided above, in relation to the actions described for the first network node 111, and will thus not be repeated here to simplify the description. For example, the first time period may comprise one or more first subframes and the second time period may comprise one or more second subframes.

The method comprises the actions described below. One or more embodiments may be combined, where applicable. All possible combinations are not described to simplify the description.

Action 301

In order to enable the first network node 111 to determine whether or not the wireless device 130 may require synchronization, during the first time period, with the second network node 112, based on whether the wireless device 130 lacks synchronization during the first time period, in this Action 301, the third network node 113 obtains the prediction of the wireless device 130 lacking synchronization, with the second network node 112 serving the wireless device 130. The prediction is of the wireless device 130 lacking synchronization during the first time period.

Obtaining in this Action 301 may be understood as determining or calculating. The obtaining in this Action 301 may be understood to be performed based on machine learning, as described earlier for the first network node 111.

For example, the obtaining of the prediction, of the wireless device 130 lacking synchronization, with the second network node 112 serving the wireless device 130, may be the mathematical estimation based on the one or more computer-derived mathematical models described earlier. The one or more computer-derived mathematical models may have been derived and updated in the automated process based on at least one of: a) the historical data on data communication by the wireless device 130 or by another wireless device; b) the simulated data on data communication by the wireless device 130 or by another wireless device; and c) the one or more characteristics of the environment of the data communication by the wireless device 130 before one of: the first time period and the second time period.

A particular example of the one or more computer-derived mathematical models may a machine learning algorithm, e.g. neural networks, support vector machines, linear prediction, tree based methods such as random forest, etc. solving a classification problem, where the classes may be whether data is expected within a certain time period and/or if the wireless device 130 is expected to have lost synchronization until the mentioned time period.

The prediction may be that the wireless device 130 is expected to lack synchronization with the second network node 112 during the first time period, or that the wireless device 130 is expected to be synchronized with the second network node 112 during the first time period.

Action 302

In this Action 503, the third network node 113 initiates providing the indication of the obtained prediction to the first network node 111 operating in the wireless communications network 100. The initiating in this Action 302 is performed before the second time period, the second time period preceding the first time period, so that the synchronization procedure is enabled to be completed prior to the first time period. That is, the third network node 113 may be understood to initiate providing the indication of the obtained prediction to the first network node 111 sufficiently early to allow the first network node 111 to perform the determination of Action 203, and for the synchronization procedure to be completed prior to the first time period, if such synchronization is found to be necessary.

Initiating providing may be understood as beginning or triggering outputting, or sending, e.g., via the third link 143.

The third network node 113 may also be understood in some examples, to obtain the prediction of whether there will be data communication between the wireless device 130 and the second network node 112 during the first time period. In some of these examples, the third network node 113 may also be understood to initiate providing yet another indication of the obtained prediction to the first network node 111.

Figure 4:
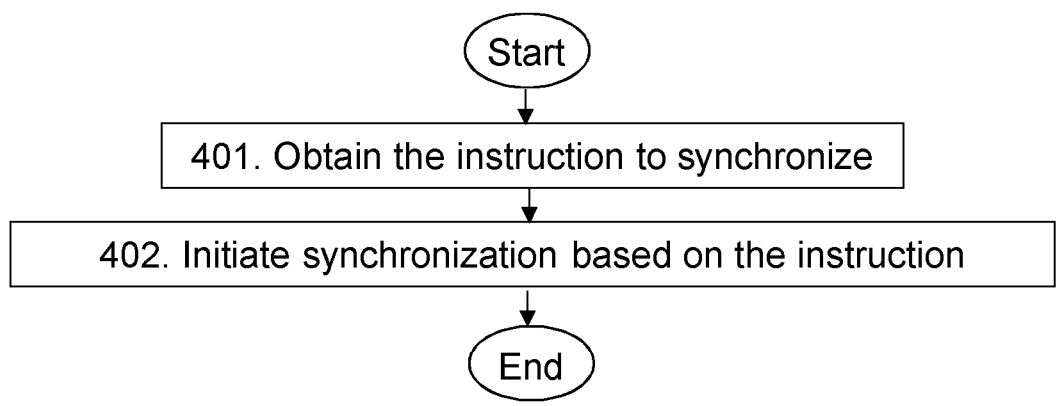
FIG. 4 is a flowchart depicting embodiments of a method in a second network node, according to embodiments herein.

Embodiments of a method, performed by the second network node 112, for handling synchronization of the wireless device 130, will now be described with reference to the flowchart depicted in FIG. 4. The second network node 112 serves the wireless device 130. As stated earlier, the second network node 112 and the wireless device 130 operate in the wireless communications network 100.

The detailed description of some of the following corresponds to the same references provided above, in relation to the actions described for the first network node 111, and will thus not be repeated here to simplify the description. For example, the first time period may comprise one or more first subframes and the second time period may comprise one or more second subframes.

The method comprises the actions described below. One or more embodiments may be combined, where applicable. All possible combinations are not described to simplify the description.

Action 401

In order to ensure that the data communication between the wireless device 130 and the second network node 112 during the first time period may take place by enabling that the wireless device 130 and the second network node 112 are synchronized during the first time period, in this Action 401, the second network node 112 obtains, from the first network node 111 operating in the wireless communications network 100, the instruction to command the wireless device 130 to synchronize with the second network node 112. The obtaining in this Action 401 is based on the result of the determination of whether or not the wireless device 130 requires synchronization, during the first time period, with the second network node 112, e.g., as obtained by the first network node 111 in Action 202. The obtaining in this Action 401 is further based on the prediction of the at least one of: a) data communication between the wireless device 130 and the second network node 112 during the first time period, and b) the wireless device 130 lacking synchronization during the first time period, as described earlier.

Obtaining may be understood as receiving, e.g., via the first link 141, which may be a radio link or a wired link.

The second network node 112 may be understood to obtain the instruction sufficiently early to enable the synchronization procedure to be completed prior to the beginning of the first time period.

Action 402

In this Action 402, the second network node 112 initiates, based on the obtained instruction in Action 401, commanding the wireless device 130 to synchronize with the second network node 112 during the second time period. The second time period precedes the first time period, so that the synchronization procedure is completed prior to the first time period. In other words, the second network node 112 initiates the commanding of the wireless device 130 to synchronize sufficiently early to enable the synchronization procedure to be completed prior to the beginning of the first time period. For example, in some embodiments, the end of the second time period may precede the beginning of the first time period by less than ten seconds.

Initiating commanding may be understood as beginning or triggering outputting a command, or sending a message, e.g., via the second link 143.

Figure 5:
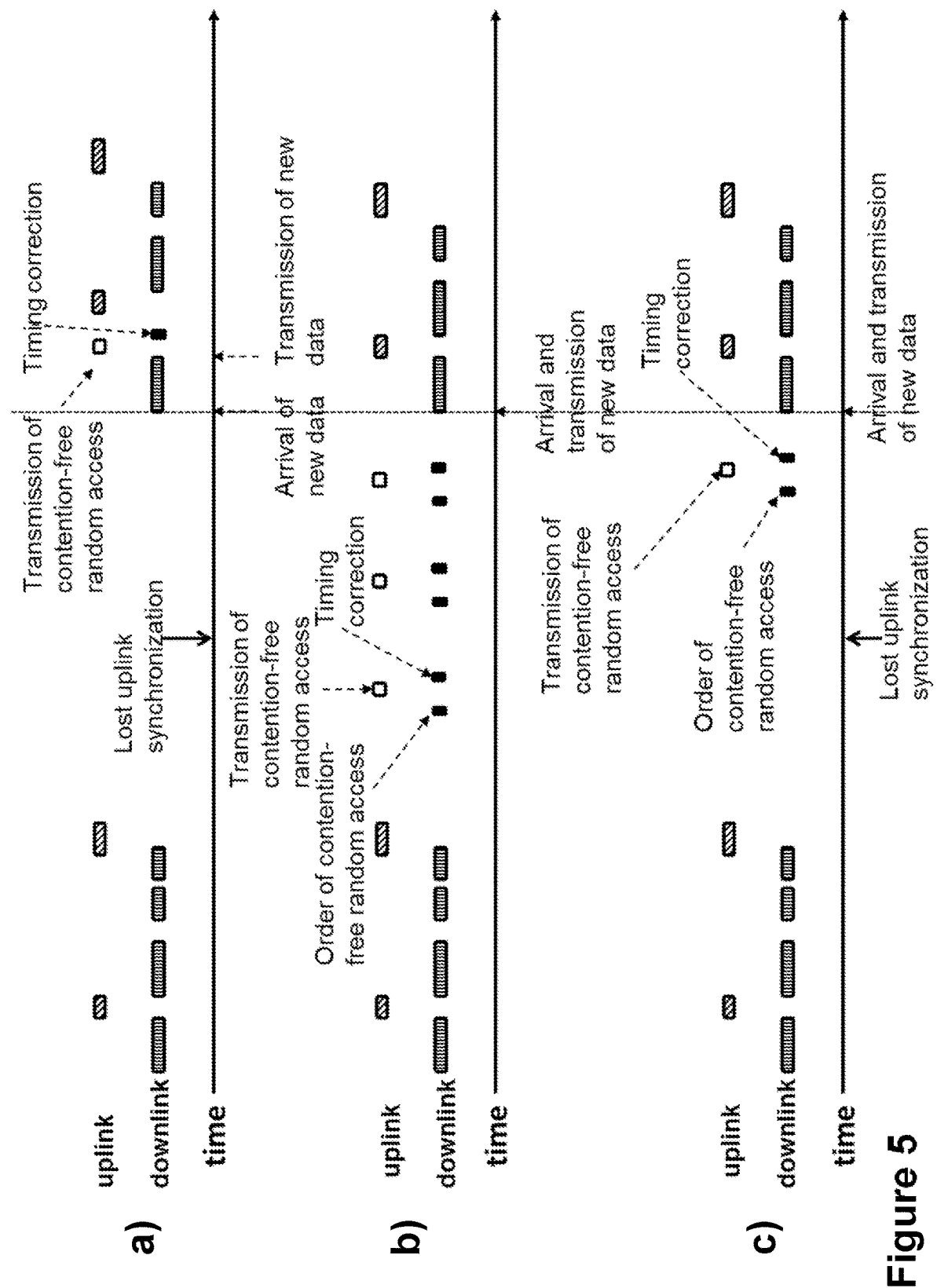
FIG. 5 is a schematic representation illustrating a comparison of existing methods, in a) and b), with a non-limiting example of embodiments herein with data arrival prediction, in c).

FIG. 5 is a schematic representation illustrating a comparison of existing methods, that is, methods prior to the embodiments herein, depicted in panels a) and b), with a non-limiting example of embodiments herein with data arrival prediction, in c). In FIG. 5, the wireless device 130 is a UE, and the second network node 112 is a base station, e.g., an eNB. In all three examples, a UE has received and transmitted some data in the DL-represented as rectangles with vertical stripes-, and UL-represented as rectangles with diagonal stripes-, respectively. This is followed by a period without any transmission while, still in RRC connected. During this period, the uplink synchronization is lost, as indicated by the solid arrow, unknown to the UE and base station, if there is no intermediate data transmission or synchronization done. In the first case depicted in a), the uplink synchronization is solved upon need, that is, with the arrival of new data as indicated by the vertical dashed line. The uplink part of the transmission, indicated by the arrow labelled as transmission of new data, is therefore delayed. That is, the uplink part of the transmission has higher latency, compared to the other two cases depicted in b) and c), due to the synchronization having to be performed before uplink transmission. The performance of the synchronization procedure is indicated by the transmission of the contention free random access in the uplink and the timing correction in the downlink. In the second case, depicted in b), the synchronization is solved by performing uplink synchronizations when there has been no uplink communication within a certain pre-determined time period. This is indicated in b) by the order of contention-free random access in the downlink, followed by the transmission of the contention free random access in the uplink and the timing correction in the downlink, which is repeated twice more, prior to the arrival of new data for transmission. In b), when new data arrives as indicated by the vertical arrow, the UE is already synchronized since the synchronization has taken place at the pre-determined time periods. However, radio and processing resources have been wasted by performing the first two synchronization procedures, since there was no data to transmit, and therefore they were not necessary. Moreover, power at both sides has been unnecessarily consumed, which may be more critical for the UE, which may run on battery. In the third case, depicted in c), according to Action 301, the predictor, that is, the third network node 113 has predicted arrival of data within the first time period, which may be named e.g., "Tp1", and the UE has performed the synchronization procedure during the second time period, prior to the actual arrival of data. The input to the predictor may be, as mentioned earlier, e.g., the packet protocol, the time duration since the last packet, etc. As may be appreciated in FIG. 5, the delay of the data transmissions in b) and c) are equal. However, in c), according to Actions 401 and 402, the second network node 112 only performs synchronization when needed, as determined by the first network node 111 in Action 202, based on the prediction of the third network node 113, which may be implemented as a same network node, or be co-localized.

Figure 6:
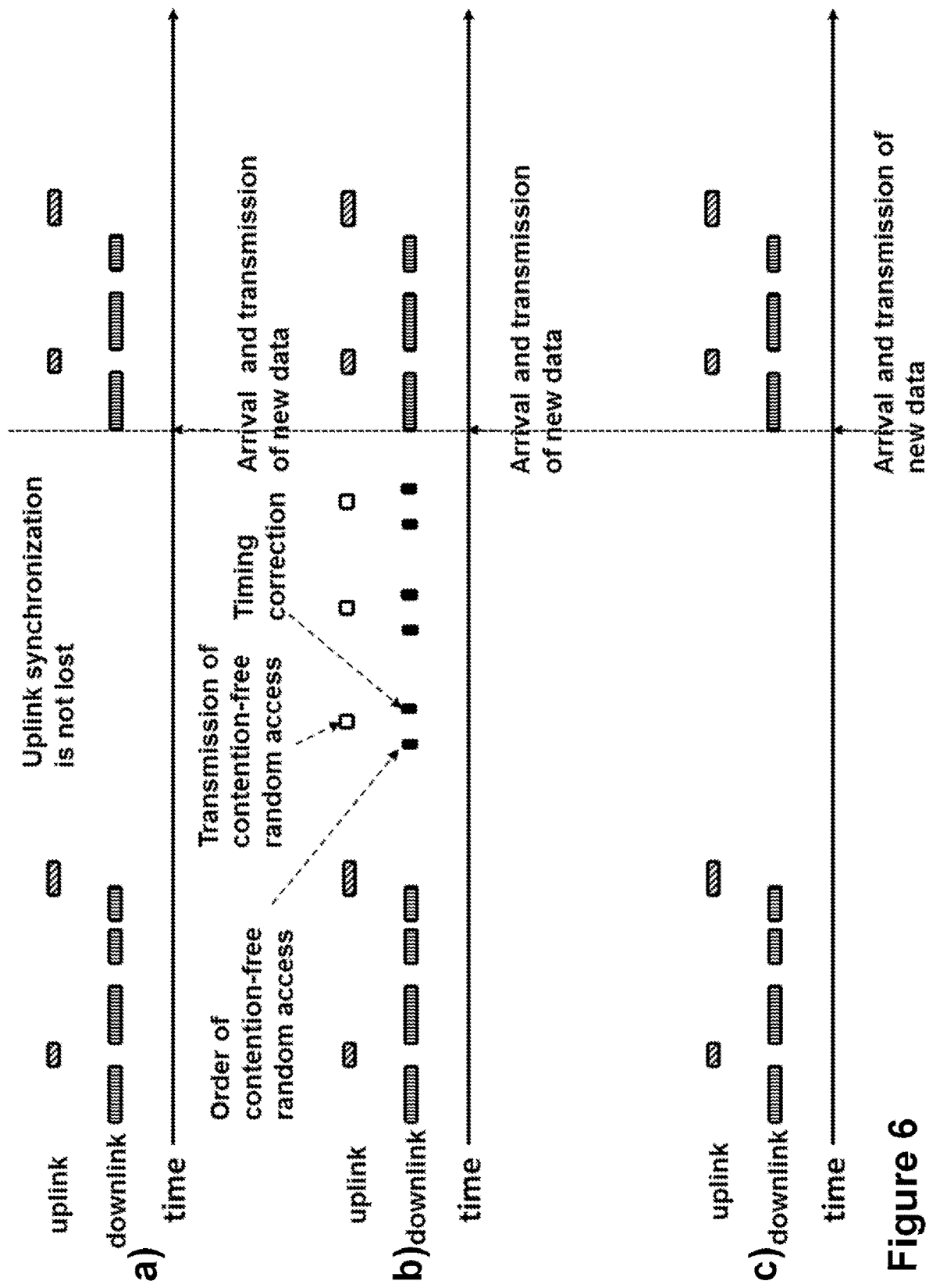
FIG. 6 is a schematic representation illustrating a comparison of existing methods, in a) and b), with a non-limiting example of embodiments herein with uplink synchronization prediction, in c).

FIG. 6 illustrates the same process as FIG. 5, but with uplink synchronization prediction. Examples of methods prior to the embodiments herein are depicted in panels a) and b), and a non-limiting example of embodiments herein is depicted in panel c) with uplink synchronization prediction. In the examples illustrated in FIG. 6), the UE is assumed to still have uplink synchronization even though it has not transmitted uplink data for a while. In the first case depicted in panel a), the base station does not request uplink synchronization until it has encountered a problem in the uplink transmission. Since in this particular case, no problem has been encountered because synchronization has not been lost, it does not need to perform any synchronization, which means that there is no added signalling, and no added delay to the data transmission by the UE. However, should it have encountered a problem, the performance of the synchronization procedure would have been delayed, and so would have been the transmission of the new data. In the second case depicted in panel b), the synchronization is handled just as in the second case in FIG. 5, with no added delay but with unnecessary synchronizations performed at the pre-determined time periods. In the third example depicted in c), according to Action 302, the synchronization predictor, that is, the third network node 113, does not find it likely that the UE has lost uplink synchronization, which means that the UE will not perform any synchronization, thus avoiding synchronization and avoiding added delay. Hence, the in the third example depicted in c), not only will radio and processing resources be saved, as well as energy, in comparison with the example of panel b), but transmission problems and delays will be prevented, in comparison with the example of panel a).

Furthermore, as stated earlier, the examples of panels c) in FIG. 5 and FIG. 6 may be combined according to other examples of embodiments herein. When combining the data arrival prediction and uplink synchronization prediction, unnecessary synchronizations may be avoided by making sure that they are only performed when data arrival is expected and the wireless device 130 is likely to be out of synchronization.

According to the foregoing, one benefit of embodiments herein is that they allow for uplink synchronization without unnecessary signalling, as opposed to e.g., in panel b) of FIG. 5 and FIG. 6. Another further advantage of embodiments herein is that they allow to reduce added delay due to uplink synchronization being performed prior to data transmission, and not upon data arrival, as e.g., in panel a) of FIG. 5 and FIG. 6.

A method performed by the telecommunications system 180 may comprise one or more of the following actions. The telecommunications system 180 may comprise the host computer 150, and at least one of the first network node 111, the second network node 112, the third network node 113, and the wireless device 130.

Figure 7:
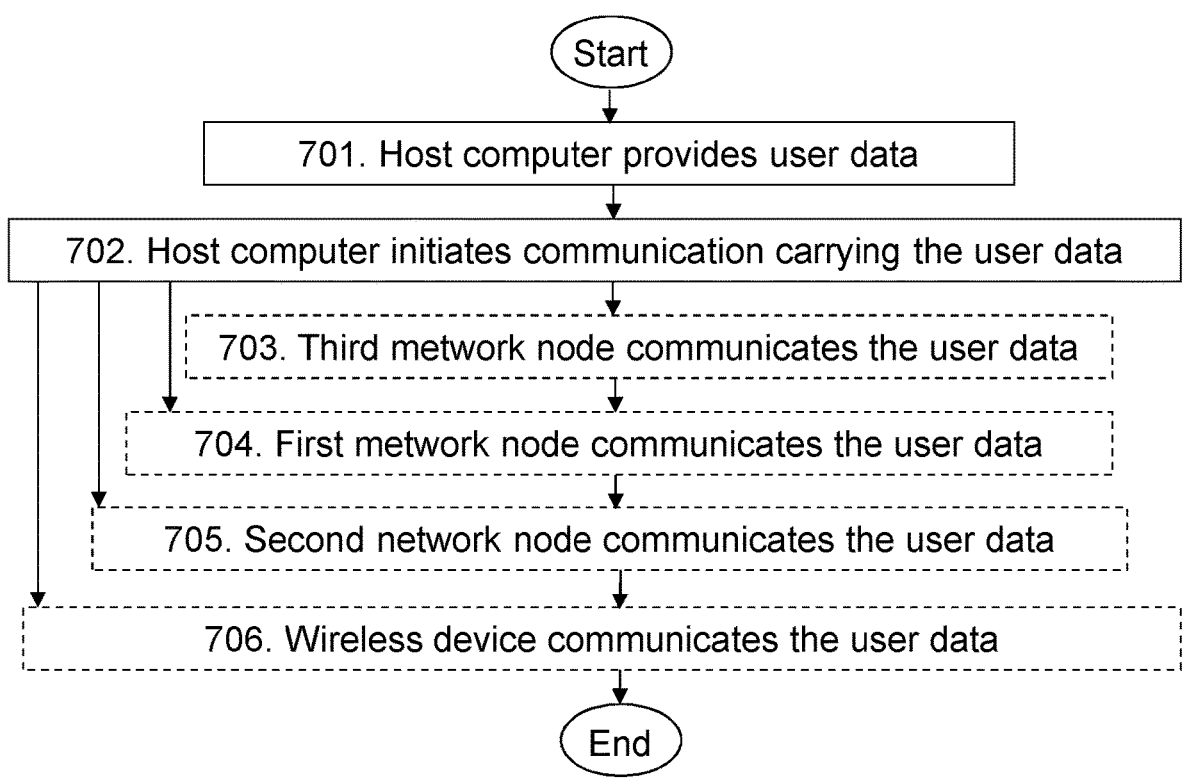
FIG. 7 is a flowchart depicting a method in a telecommunications system, according to embodiments herein.

In some embodiments all the actions may be performed. In other embodiments, one or more actions may be performed. One or more embodiments may be combined, where applicable. All possible combinations are not described to simplify the description. In FIG. 7, optional actions are indicated with dashed lines. Some actions may be performed in a different order than that shown in FIG. 7. For example, since communication may be any of reception of transmission, the actions may be performed in the opposite order than that depicted in FIG. 7.

Action 701

In this Action 701, the telecommunications system 180 may provide, at the host computer 150, user data for a user of the wireless device 130.

Action 702

In this Action 702, the telecommunications system 180 may initiate a communication, at the host computer 150, carrying the user data to the wireless device 130.

Action 703

In some embodiments, the telecommunications system 180 may communicate, at the third network node 113, the user data which was carried in the communication that the host computer 150 initiated to the wireless device 130, wherein the third network node 113 further performs the Action 301 of obtaining the prediction of the wireless device 130 lacking synchronization, during the first time period, with the second network node 112 serving the wireless device 130. The third network node 113 may further perform the Action 302 of initiating providing the indication of the obtained prediction to the first network node 111 operating in the wireless communications network 100, wherein the initiating is performed before the second time period, the second time period preceding the first time period, so that the synchronization procedure is enabled to be completed prior to the first time period.

Action 704

In some embodiments, the telecommunications system 180 may communicate, at the first network node 111, the user data which was carried in the transmission that the host computer 150 initiated to the wireless device 130, wherein the first network node 111 further performs the Action 202 of determining whether or not the wireless device 130 requires synchronization, during the first time period, with the second network node 112 serving the wireless device 130, the determining 202 being based on the prediction of at least one of: a) data communication between the wireless device 130 and the second network node 112 during the first time period, and b) the wireless device 130 lacking synchronization during the first time period. The first network node 111 may further perform the Action 203 of initiating, based on a result of the determination, the synchronization procedure of the wireless device 130 with the second network node 112 during the second time period, the second time period preceding the first time period, so that the synchronization procedure is completed prior to the first time period.

Figure 2:
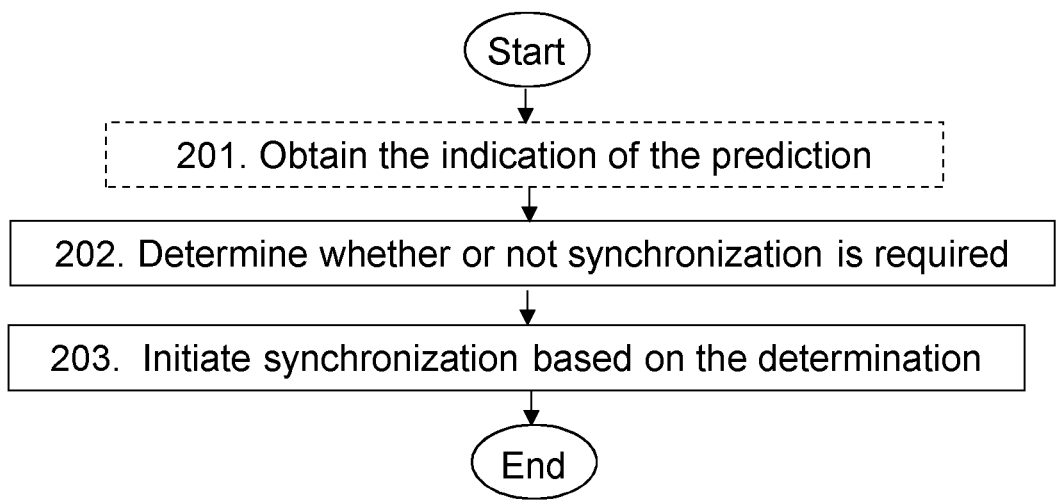
FIG. 2 is a flowchart depicting embodiments of a method in a first network node, according to embodiments herein.

The first network node 111 may further perform the Action 201 described in relation to FIG. 2, as described before.

Action 705

In some embodiments, the telecommunications system 180 may communicate, at the second network node 112 the user data which was carried in the transmission that the host computer 150 initiated to the wireless device 130, wherein the second network node 112 further performs the Action 401 of obtaining, from the first network node 111 operating in the wireless communications network 100, the instruction to command the wireless device 130 to synchronize with the second network node 112, the obtaining 401 being based on the result of the determination of whether or not the wireless device 130 requires synchronization, during the first time period, with the second network node 112. The obtaining 401 is based on the prediction of at least one of: a) data communication between the wireless device 130 and the second network node 112 during the first time period, and b) the wireless device 130 lacking synchronization during the first time period. The second network node 112 may further perform the Action 402 of initiating, based on the obtained instruction, commanding the wireless device 130 to synchronize with the second network node 112 during the second time period. The second time period precedes the first time period, so that the synchronization procedure is completed prior to the first time period.

Action 706

In some embodiments, the telecommunications system 180 may communicate, at the wireless device 130, the user data to or from the host computer 150, e.g., via the sixth link 160, and e.g., via any of the first network node 111, the second network node 112, and the third network node 113.

Figure 8A:
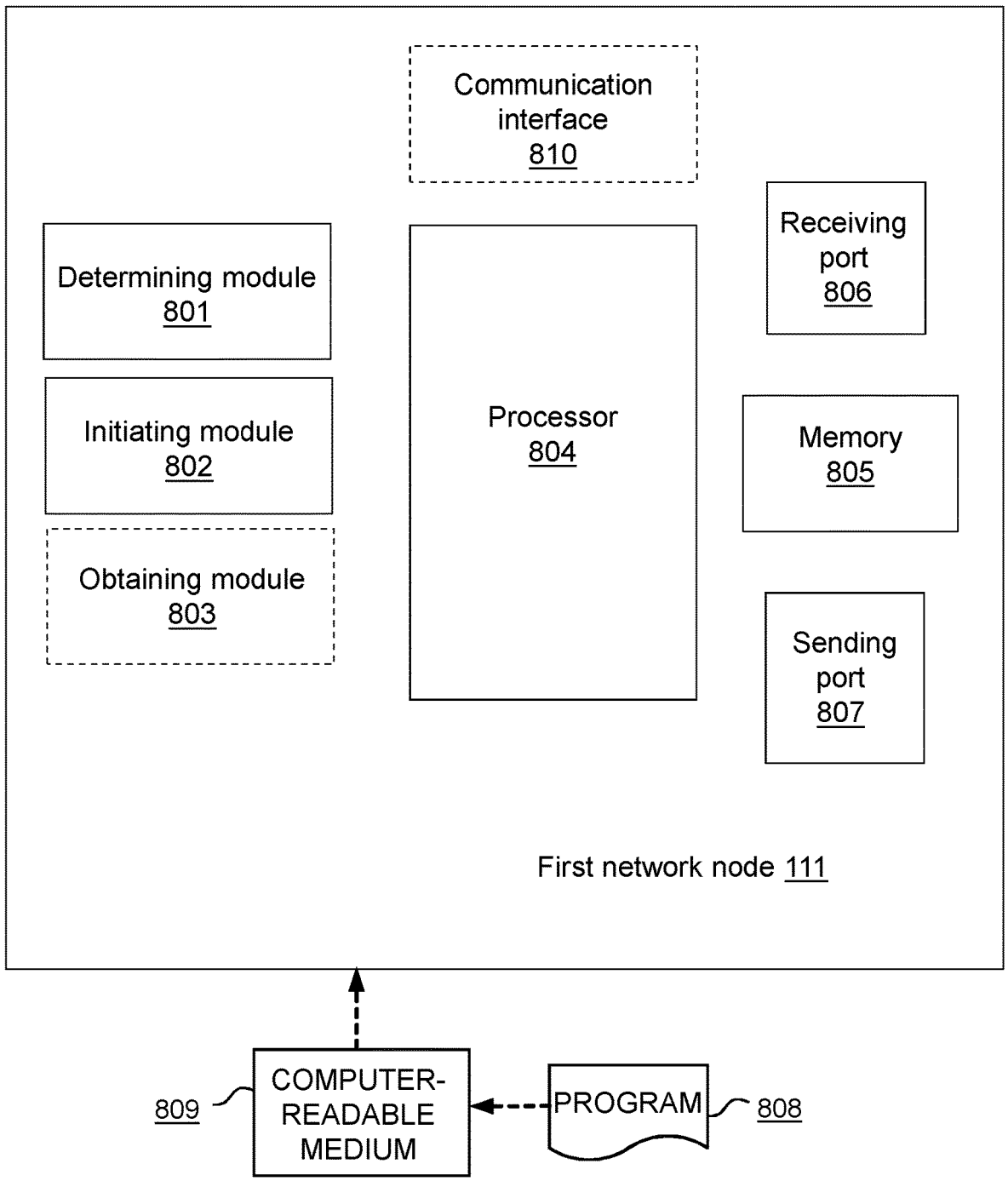
FIG. 8a is a schematic block diagram illustrating an embodiment of a first network node, according to embodiments herein.

To perform the method actions described above in relation to FIG. 2, FIG. 5c FIG. 6c, and FIG. 7, the first network node 111 may comprise the following arrangement depicted in FIG. 8a. The first network node 111 is configured to handle synchronization of the wireless device 130. As stated earlier, the first network node 111 and the wireless device 130 are configured to operate in the wireless communications network 100.

The detailed description of some of the following corresponds to the same references provided above, in relation to the actions described for the first network node 111, and will thus not be repeated here. For example, the first time period may be configured to comprise one or more first subframes and the second time period may be configured to comprise one or more second subframes.

The first network node 111 is further configured to, e.g. by means of a determining module 801 configured to, determine whether or not the wireless device 130 requires synchronization, during the first time period, with the second network node 112 configured to serve the wireless device 130. To determine is configured to be based on the prediction of the at least one of: a) data communication between the wireless device 130 and the second network node 112 during the first time period, and b) the wireless device 130 lacking synchronization during the first time period.

In some embodiments, the prediction may be the mathematical estimation configured to be based on the one or more computer-derived mathematical models. The one or more computer-derived mathematical models may be configured to have been derived and updated in the automated process based on at least one of: a) the historical data on data communication by the wireless device 130 or by another wireless device; b) the simulated data on data communication by the wireless device 130 or by another wireless device; and c) the one or more characteristics of the environment of the data communication by the wireless device 130 before one of: the first time period and the second time period.

In some embodiments, the end of the second time period may be configured to precede the beginning of the first time period by less than ten seconds.

The first network node 111 is further configured to, e.g., by means of an initiating module 802 configured to, initiate, based on the result of the determination, the synchronization procedure of the wireless device 130 with the second network node 112 during the second time period. The second time period is configured to precede the first time period, so that the synchronization procedure is completed prior to the first time period.

In some embodiments, the first network node 111 is configured to one of: a) initiate the synchronization procedure when the result of the determination is that the wireless device 130 requires synchronization during the first time period, and b) avoid initiation of the synchronization procedure when the result of the determination is that the wireless device 130 does not require synchronization during the first time period.

To initiate the synchronization procedure of the wireless device 130 with the second network node 112 may comprise to provide, to the second network node 112, the instruction to command the wireless device 130 to synchronize with the second network node 112.

In some embodiments, that to determine is configured to be based on the prediction may comprise one of: a) when data communication between the wireless device 130 and the second network node 112 is predicted to occur during the first time period, the configured result of the determination is that the wireless device 130 requires synchronization with the second network node 112 during the first time period; b) when data communication between the wireless device 130 and the second network node 112 is predicted to not occur during the first time period, the configured result of the determination is that the wireless device 130 does not require synchronization with the second network node 112 during the first time period; c) when the wireless device 130 is configured to be predicted to lack synchronization with the second network node 112 during the first time period, the configured result of the determination is that the wireless device 130 requires synchronization with the second network node 112 during the first time period; and d) when the wireless device 130 is configured to be predicted to be synchronized with the second network node 112 during the first time period, the configured result of the determination is that the wireless device 130 does not require synchronization with the second network node 112 during the first time period.

In some embodiments, the first network node 111 may be further configured to, e.g., by means of an obtaining module 803 configured to, obtain the indication of the prediction autonomously or from the third network node 113 configured to operate in the wireless communications network 100.

The embodiments herein in the first network node 111 may be implemented through one or more processors, such as a processor 804 in the first network node 111 depicted in FIG. 8a, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the in the first network node 111. One such carrier may be in the form of a CD ROM disc. It is however feasible with other data carriers such as a memory stick. The computer program code may furthermore be provided as pure program code on a server and downloaded to the first network node 111.

The first network node 111 may further comprise a memory 805 comprising one or more memory units. The memory 805 is arranged to be used to store obtained information, store data, configurations, schedulings, and applications etc. to perform the methods herein when being executed in the first network node 111.

In some embodiments, the first network node 111 may receive information from, e.g., any of the second network node 112, the third network node 113, the wireless device 130, and the host computer 150, through a receiving port 806. In some embodiments, the receiving port 806 may be, for example, connected to one or more antennas in first network node 111. In other embodiments, the first network node 111 may receive information from another structure in the wireless communications network 100 through the receiving port 806. Since the receiving port 806 may be in communication with the processor 804, the receiving port 806 may then send the received information to the processor 804. The receiving port 806 may also be configured to receive other information.

The processor 804 in the first network node 111 may be further configured to transmit or send information to e.g., any of the second network node 112, the third network node 113, the wireless device 130, and the host computer 150, through a sending port 807, which may be in communication with the processor 804, and the memory 805.

Those skilled in the art will also appreciate that the determining module 801, the initiating module 802, and the obtaining module 803, described above may refer to a combination of analog and digital modules, and/or one or more processors configured with software and/or firmware, e.g., stored in memory, that, when executed by the one or more processors such as the processor 804, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 801-803 described above may be implemented as one or more applications running on one or more processors such as the processor 804.

Thus, the methods according to the embodiments described herein for the first network node 111 may be respectively implemented by means of a computer program 808 product, comprising instructions, i.e., software code portions, which, when executed on at least one processor 804, cause the at least one processor 804 to carry out the actions described herein, as performed by the first network node 111. The computer program 808 product may be stored on a computer-readable storage medium 809. The computer-readable storage medium 809, having stored thereon the computer program 808, may comprise instructions which, when executed on at least one processor 804, cause the at least one processor 804 to carry out the actions described herein, as performed by the first network node 111. In some embodiments, the computer-readable storage medium 809 may be a non-transitory computer-readable storage medium, such as a CD ROM disc, or a memory stick. In other embodiments, the computer program 808 product may be stored on a carrier containing the computer program 808 just described, wherein the carrier is one of an electronic signal, optical signal, radio signal, or the computer-readable storage medium 809, as described above.

The first network node 111 may comprise a communication interface 810 configured to facilitate communications between the first network node 111 and other nodes or devices, e.g., any of the second network node 112, the third network node 113, the wireless device 130, and the host computer 150. The interface may, for example, include a transceiver configured to transmit and receive radio signals over an air interface in accordance with a suitable standard.

Figure 8B:
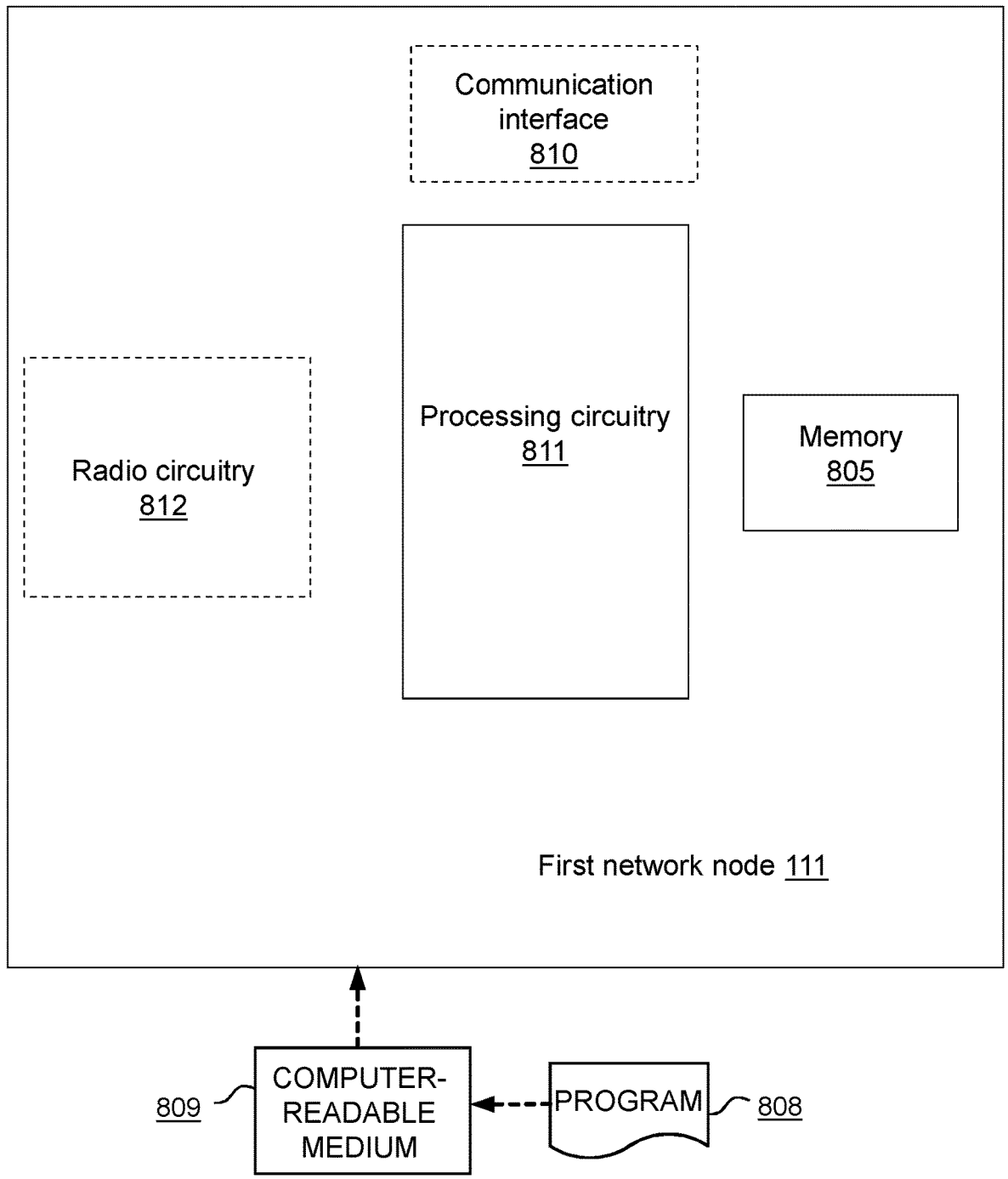
FIG. 8b is a schematic block diagram illustrating another embodiment of a first network node, according to embodiments herein.

In other embodiments, to perform the method actions described above in relation to FIG. 2, FIG. 5c FIG. 6c, and FIG. 7, the first network node 111 may comprise the following arrangement depicted in FIG. 8b. The first network node 111 may comprise a processing circuitry 811, e.g., one or more processors such as the processor 804, in the first network node 111 and the memory 805. The first network node 111 may also comprise a radio circuitry 812, which may comprise e.g., the receiving port 806 and the sending port 807. The processing circuitry 811 may be configured to perform the method actions according to FIG. 2, in a similar manner as that described in relation to FIG. 8a. The radio circuitry 811 may be configured to set up and maintain at least a wireless connection with any of the second network node 112, the third network node 113, the wireless device 130, and the host computer 150.

Hence, embodiments herein also relate to the first network node 111 operative to handle the synchronization of the wireless device 130, the first network node 111 and the wireless device 130 being operative to operate in the wireless communications network 100. The first network node 111 comprises the processing circuitry 811 and the memory 805, said memory 805 containing instructions executable by said processing circuitry 811, whereby the first network node 111 is further operative to: a) determine whether or not the wireless device 130 requires synchronization, during the first time period, with the second network node 112 operative to serve the wireless device 130, wherein to determine is based on the prediction of at least one of: i) the data communication between the wireless device 130 and the second network node 112 during the first time period, and ii) the wireless device 130 lacking synchronization during the first time period, and operative to b) initiate, based on the result of the determination, the synchronization procedure of the wireless device 130 with the second network node 112 during the second time period, the second time period preceding the first time period, so that the synchronization procedure is completed prior to the first time period.

In some embodiments, the first network node 111 may be further operative to one of: a. initiate the synchronization procedure when the result of the determination is that the wireless device 130 requires synchronization during the first time period, and b. avoid initiation of the synchronization procedure when the result of the determination is that the wireless device 130 does not require synchronization during the first time period.

In some embodiments, the first network node 111 may be further operative to obtain the indication of the prediction autonomously or from the third network node 113 operative to operate in the wireless communications network 100.

The prediction may be a mathematical estimation based on the one or more computer-derived mathematical models, the one or more computer-derived mathematical models having been derived and updated in the automated process based on at least one of: a) the historical data on data communication by the wireless device 130 or by the another wireless device; b) the simulated data on data communication by the wireless device 130 or by the another wireless device; and c) the one or more characteristics of the environment of the data communication by the wireless device 130 before one of: the first time period and the second time period.

In some embodiments, to initiate the synchronization procedure of the wireless device 130 with the second network node 112 may comprise to provide, to the second network node 112, the instruction to command the wireless device 130 to synchronize with the second network node 112.

That to determine is based on the prediction may comprise one of: a) when data communication between the wireless device 130 and the second network node 112 is predicted to occur during the first time period, the result of the determination is that the wireless device 130 requires synchronization with the second network node 112 during the first time period; b) when data communication between the wireless device 130 and the second network node 112 is predicted to not occur during the first time period, the result of the determination is that the wireless device 130 does not require synchronization with the second network node 112 during the first time period; c) when the wireless device 130 is predicted to lack synchronization with the second network node 112 during the first time period, the result of the determination is that the wireless device 130 requires synchronization with the second network node 112 during the first time period; and d) when the wireless device 130 is predicted to be synchronized with the second network node 112 during the first time period, the result of the determination is that the wireless device 130 does not require synchronization with the second network node 112 during the first time period.

The first time period may comprise one or more first subframes and the second time period may comprise one or more second subframes.

In some embodiments, the end of the second time period precedes the beginning of the first time period by less than ten seconds.

Figure 9A:
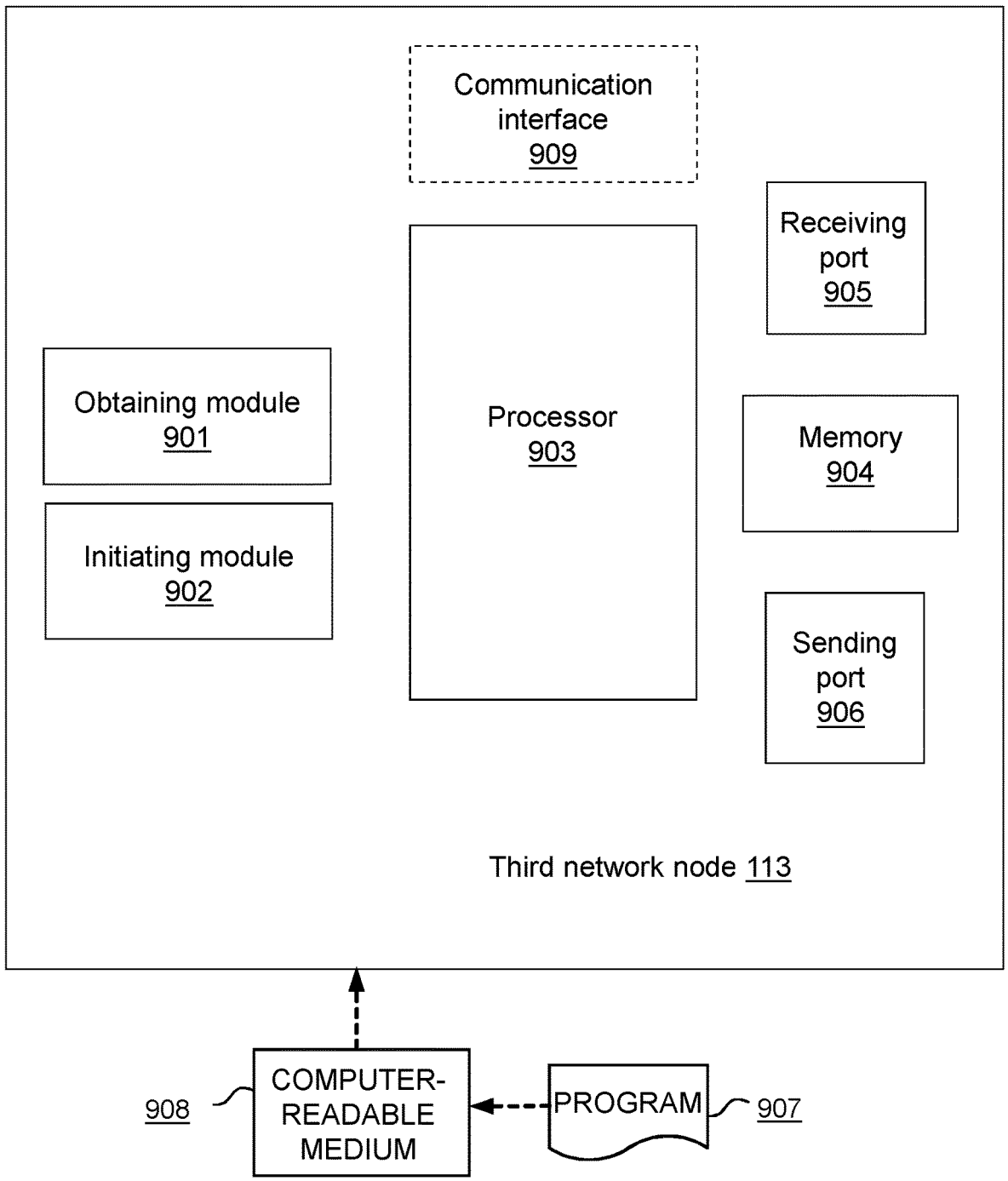
FIG. 9a is a schematic block diagram illustrating an embodiment of a third network node, according to embodiments herein.

To perform the method actions described above in relation to FIG. 3, FIG. 5*c* FIG. 6*c*, and FIG. 7, the third network node 113 may comprise the following arrangement depicted in FIG. 9*a*. The third network node 113 is configured to handle the synchronization of the wireless device 130. As stated earlier, the third network node 113 and the wireless device 130 are configured to operate in the wireless communications network 100.

The detailed description of some of the following corresponds to the same references provided above, in relation to the actions described for the third network node 113, and will thus not be repeated here. For example, the first time period may be configured to comprise one or more first subframes and the second time period may be configured to comprise one or more second subframes.

The third network node 113 is further configured to, e.g. by means of an obtaining module 901 configured to, obtain the prediction of the wireless device 130 lacking synchronization, during the first time period, with the second network node 112 configured to serve the wireless device 130.

The prediction may be configured to be the mathematical estimation based on the one or more computer-derived mathematical models. The one or more computer-derived mathematical models may be configured to have been derived and updated in the automated process based on at least one of: a) the historical data on data communication by the wireless device 130 or by another wireless device; b) the simulated data on data communication by the wireless device 130 or by another wireless device; and c) the one or more characteristics of the environment of the data communication by the wireless device 130 before one of: the first time period and the second time period.

The third network node 113 is further configured to, e.g., by means of an initiating module 902 configured to, initiate providing the indication of the prediction configured to be obtained to the first network node 111 configured to operate in the wireless communications network 100. To initiate is configured to be performed before the second time period. The second time period is configured to precede the first time period, so that the synchronization procedure is enabled to be completed prior to the first time period.

The embodiments herein in the third network node 113 may be implemented through one or more processors, such as a processor 903 in the third network node 113 depicted in FIG. 9*a*, together with computer program code for performing the functions and actions of the embodiments herein. The program code mentioned above may also be provided as a computer program product, for instance in the form of a data carrier carrying computer program code for performing the embodiments herein when being loaded into the in the third network node 113. One such carrier may be in the form of a CD ROM disc. It is however feasible with other data carriers such as a memory stick. The computer program code may furthermore be provided as pure program code on a server and downloaded to the third network node 113.

The third network node 113 may further comprise a memory 904 comprising one or more memory units. The memory 904 is arranged to be used to store obtained information, store data, configurations, schedulings, and applications etc. . . . to perform the methods herein when being executed in the third network node 113.

In some embodiments, the third network node 113 may receive information from, e.g., any of the first network node 111, the second network node 112, the wireless device 130, and the host computer 150, through a receiving port 905. In some embodiments, the receiving port 905 may be, for example, connected to one or more antennas in third network node 113. In other embodiments, the third network node 113 may receive information from another structure in the wireless communications network 100 through the receiving port 905. Since the receiving port 905 may be in communication with the processor 903, the receiving port 905 may then send the received information to the processor 903. The receiving port 905 may also be configured to receive other information.

The processor 903 in the third network node 113 may be further configured to transmit or send information to e.g., any of the first network node 111, the second network node 112, the wireless device 130, and the host computer 150, through a sending port 906, which may be in communication with the processor 903, and the memory 904.

Those skilled in the art will also appreciate that the obtaining module 901 and the initiating module 902 described above may refer to a combination of analog and digital modules, and/or one or more processors configured with software and/or firmware, e.g., stored in memory, that, when executed by the one or more processors such as the processor 903, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 901-902 described above may be implemented as one or more applications running on one or more processors such as the processor 903.

Thus, the methods according to the embodiments described herein for the third network node 113 may be respectively implemented by means of a computer program 907 product, comprising instructions, i.e., software code portions, which, when executed on at least one processor 903, cause the at least one processor 903 to carry out the actions described herein, as performed by the third network node 113. The computer program 907 product may be stored on a computer-readable storage medium 908. The computer-readable storage medium 908, having stored thereon the computer program 907, may comprise instructions which, when executed on at least one processor 903, cause the at least one processor 903 to carry out the actions described herein, as performed by the third network node 113. In some embodiments, the computer-readable storage medium 908 may be a non-transitory computer-readable storage medium, such as a CD ROM disc, or a memory stick. In other embodiments, the computer program 907 product may be stored on a carrier containing the computer program 907 just described, wherein the carrier is one of an electronic signal, optical signal, radio signal, or the computer-readable storage medium 908, as described above.

The third network node 113 may comprise a communication interface 909 configured to facilitate communications between the third network node 113 and other nodes or devices, e.g., any of the second network node 112, the first network node 112, the wireless device 130, and the host computer 150. The interface may, for example, include a transceiver configured to transmit and receive radio signals over an air interface in accordance with a suitable standard.

Figure 9B:
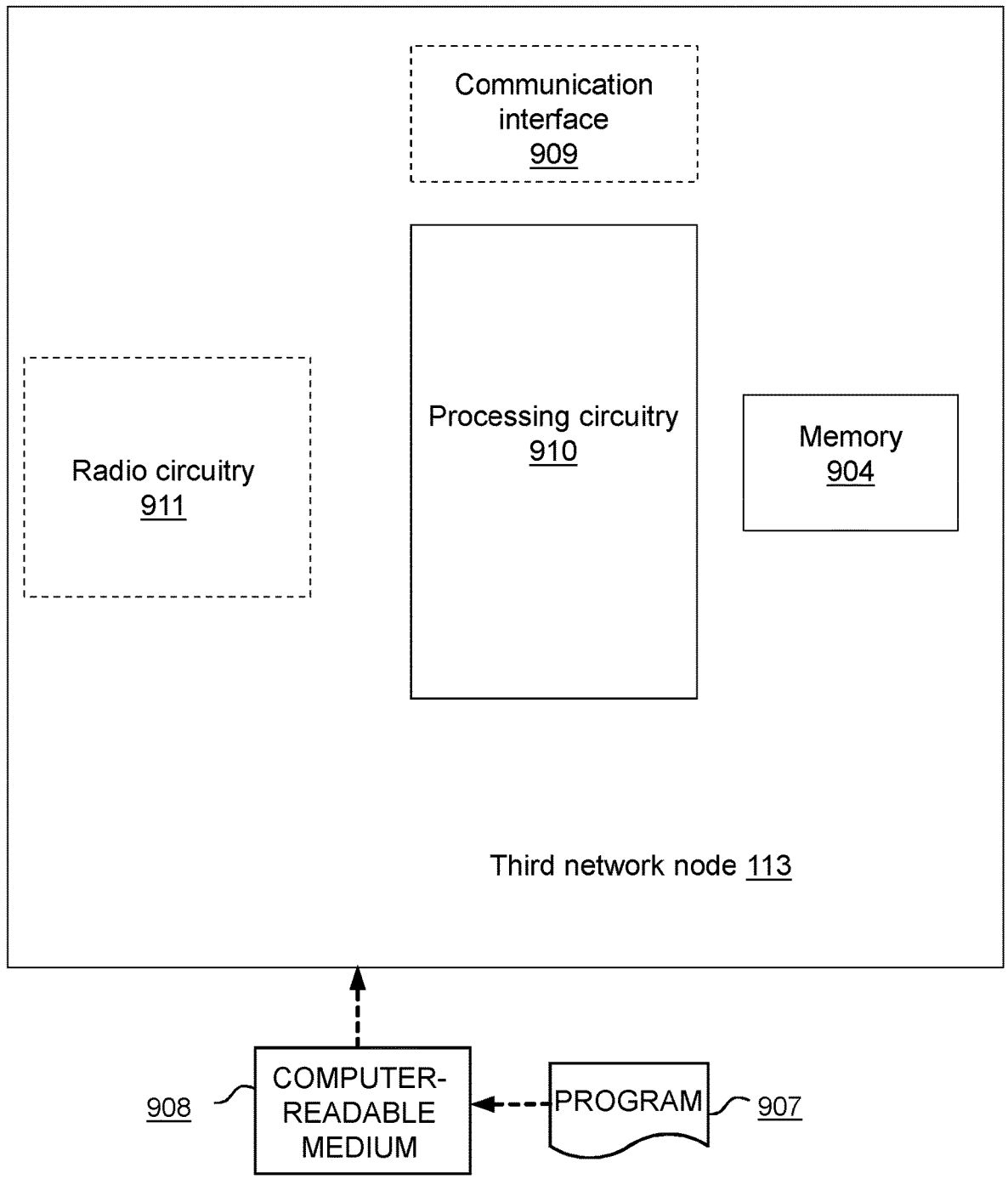
FIG. 9b is a schematic block diagram illustrating another embodiment of a third network node, according to embodiments herein.

In other embodiments, to perform the method actions described above in relation to FIG. 3, FIG. 5c FIG. 6c, and FIG. 7, the third network node 113 may comprise the following arrangement depicted in FIG. 9b. The third network node 113 may comprise a processing circuitry 910, e.g., one or more processors such as the processor 903, in the first network node 111 and the memory 904. The first network node 111 may also comprise a radio circuitry 911, which may comprise e.g., the receiving port 905 and the sending port 906. The processing circuitry 910 may be configured to perform the method actions according to FIG. 3, in a similar manner as that described in relation to FIG. 9a. The radio circuitry 910 may be configured to set up and maintain at least a wireless connection with any of the second network node 112, the first network node 111, and the wireless device 130, and the host computer 150.

Hence, embodiments herein also relate to the third network node 113 operative to handle the synchronization of a wireless device 130, the third network node 113 and the wireless device 130 being operative to operate in the wireless communications network 100. The third network node 113 comprises the processing circuitry 910 and the memory 904, said memory 904 containing instructions executable by said processing circuitry 910, whereby the third network node 113 is further operative to: a) obtain the prediction of the wireless device 130 lacking synchronization, during the first time period, with the second network node 112 operative to serve the wireless device 130, and operative to b) initiate providing the indication of the obtained prediction to the first network node 111 operative to operate in the wireless communications network 100, wherein to initiate is performed before the second time period, the second time period preceding the first time period, so that the synchronization procedure is enabled to be completed prior to the first time period.

In some embodiments, the prediction is the mathematical estimation based on the one or more computer-derived mathematical models, the one or more computer-derived mathematical models having been derived and updated in the automated process based on at least one of: a) the historical data on data communication by the wireless device 130 or by the another wireless device; b) the simulated data on data communication by the wireless device 130 or by the another wireless device; and c) the one or more characteristics of the environment of the data communication by the wireless device 130 before one of: the first time period and the second time period.

Figure 10A:
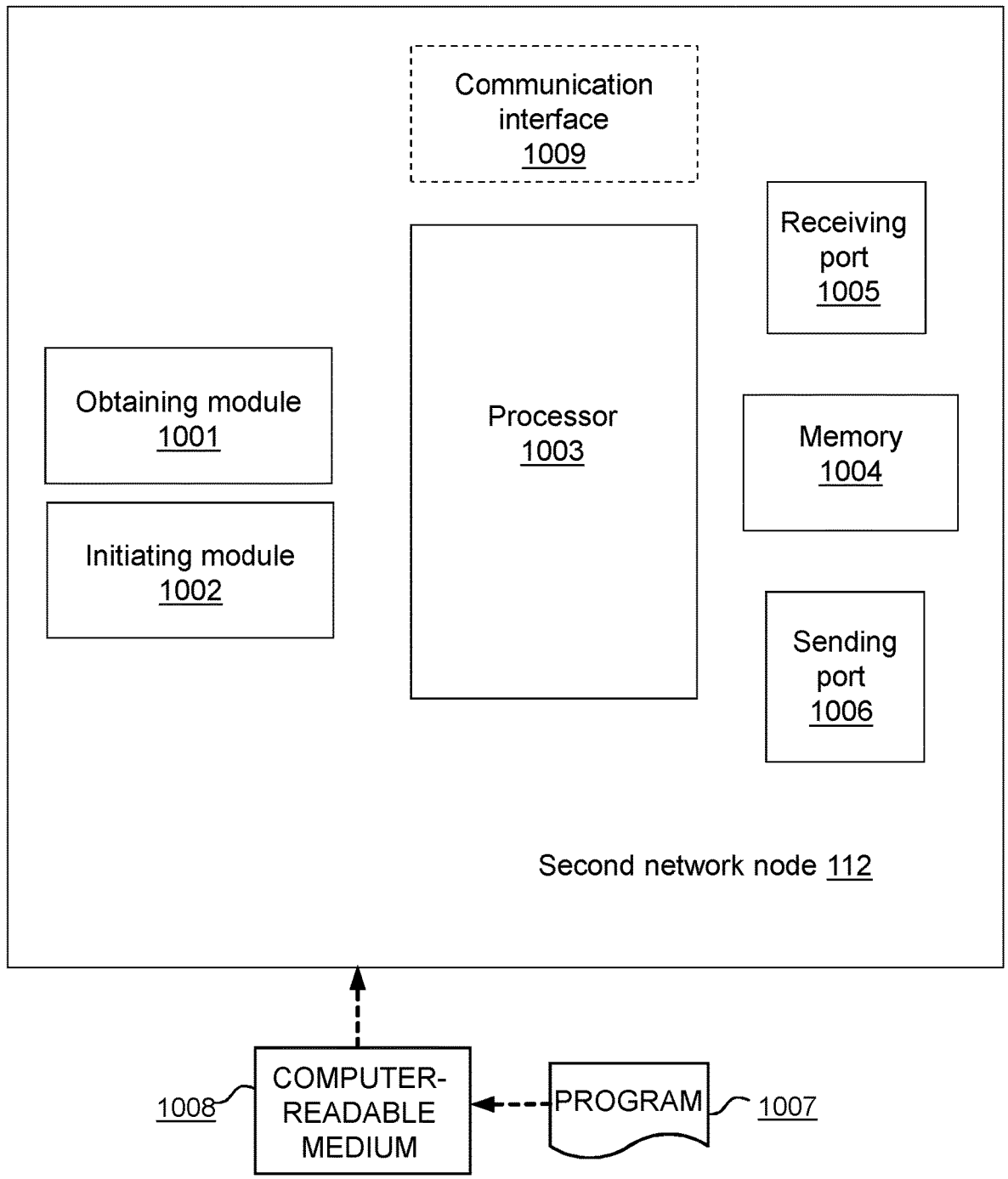
FIG. 10a is a schematic block diagram illustrating an embodiment of a second network node, according to embodiments herein.

To perform the method actions described above in relation to FIG. 4, FIG. 5c FIG. 6c, and FIG. 7, the second network node 112 may comprise the following arrangement depicted in FIG. 10a. The second network node 112 is configured to handle the synchronization of the wireless device 130. The second network node 112 is also configured to serve the wireless device 130. As stated earlier, the second network node 112 and the wireless device 130 are configured to operate in the wireless communications network 100.

The detailed description of some of the following corresponds to the same references provided above, in relation to the actions described for the second network node 112, and will thus not be repeated here. For example, the first time period may be configured to comprise one or more first subframes and the second time period may be configured to comprise one or more second subframes.

The second network node 112 is further configured to, e.g. by means of an obtaining module 1001 configured to, obtain, from the first network node 111 configured to operate in the wireless communications network 100, the instruction to command the wireless device 130 to synchronize with the second network node 112. To obtain is configured to be based on the result of the determination of whether or not the wireless device 130 requires synchronization, during the first time period, with the second network node 112. To obtain is further configured to be based on the prediction of the at least one of: a) data communication between the wireless device 130 and the second network node 112 during the first time period, and b) the wireless device 130 lacking synchronization during the first time period.

The prediction may be configured to be the mathematical estimation configured to be based on the one or more computer-derived mathematical models. The one or more computer-derived mathematical models may be configured to have been derived and updated in the automated process based on at least one of: a) the historical data on data communication by the wireless device 130 or by another wireless device; b) the simulated data on data communication by the wireless device 130 or by another wireless device; and c) the one or more characteristics of the environment of the data communication by the wireless device 130 before one of: the first time period and the second time period.

The second network node 112 is further configured to, e.g., by means of an initiating module 1002 configured to, initiate, based on the instruction configured to be obtained, commanding the wireless device 130 to synchronize with the second network node 112 during the second time period. The second time period is configured to precede the first time period, so that the synchronization procedure is completed prior to the first time period.

The result of the determination may be configured to comprise one of: a) data communication between the wireless device 130 and the second network node 112 is predicted to occur during the first time period, and the result of the determination is configured to be that the wireless device 130 requires synchronization with the second network node 112 during the first time period; and b) the wireless device 130 is predicted to lack synchronization with the second network node 112 during the first time period, and the result of the determination is configured to be that the wireless device 130 requires synchronization with the second network node 112 during the first time period.

In some embodiments, the end of the second time period may be configured to precede the beginning of the first time period by less than ten seconds.

The embodiments herein in the second network node 112 may be implemented through one or more processors, such as a processor 1003 in the second network node 112 depicted in FIG. 10*a*, together with computer program code for performing the functions and actions of the embodiments herein. The program code mentioned above may also be provided as a computer program product, for instance in the form of a data carrier carrying computer program code for performing the embodiments herein when being loaded into the in the second network node 112. One such carrier may be in the form of a CD ROM disc. It is however feasible with other data carriers such as a memory stick. The computer program code may furthermore be provided as pure program code on a server and downloaded to the second network node 112.

The second network node 112 may further comprise a memory 1004 comprising one or more memory units. The memory 1004 is arranged to be used to store obtained information, store data, configurations, schedulings, and applications etc. . . . to perform the methods herein when being executed in the second network node 112.

In some embodiments, the second network node 112 may receive information from, e.g., any of the first network node 111, the third network node 113, the wireless device 130, and the host computer 150, through a receiving port 1005. In some embodiments, the receiving port 1005 may be, for example, connected to one or more antennas in second network node 112. In other embodiments, the second network node 112 may receive information from another structure in the wireless communications network 100 through the receiving port 1005. Since the receiving port 1005 may be in communication with the processor 1003, the receiving port 1005 may then send the received information to the processor 1003. The receiving port 1005 may also be configured to receive other information.

The processor 1003 in the second network node 112 may be further configured to transmit or send information to e.g., any of the first network node 111, the second network node 112, the wireless device 130, and the host computer 150, through a sending port 1006, which may be in communication with the processor 1003, and the memory 1004.

Those skilled in the art will also appreciate that the obtaining module 1001 and the initiating module 1002 described above may refer to a combination of analog and digital modules, and/or one or more processors configured with software and/or firmware, e.g., stored in memory, that, when executed by the one or more processors such as the processor 1003, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different modules 1001-1002 described above may be implemented as one or more applications running on one or more processors such as the processor 1003.

Thus, the methods according to the embodiments described herein for the second network node 112 may be respectively implemented by means of a computer program 1007 product, comprising instructions, i.e., software code portions, which, when executed on at least one processor 1003, cause the at least one processor 1003 to carry out the actions described herein, as performed by the second network node 112. The computer program 1007 product may be stored on a computer-readable storage medium 1008. The computer-readable storage medium 1008, having stored thereon the computer program 1007, may comprise instructions which, when executed on at least one processor 1003, cause the at least one processor 1003 to carry out the actions described herein, as performed by the second network node 112. In some embodiments, the computer-readable storage medium 1008 may be a non-transitory computer-readable storage medium, such as a CD ROM disc, or a memory stick. In other embodiments, the computer program 1007 product may be stored on a carrier containing the computer program 1007 just described, wherein the carrier is one of an electronic signal, optical signal, radio signal, or the computer-readable storage medium 1008, as described above.

Figure 10B:
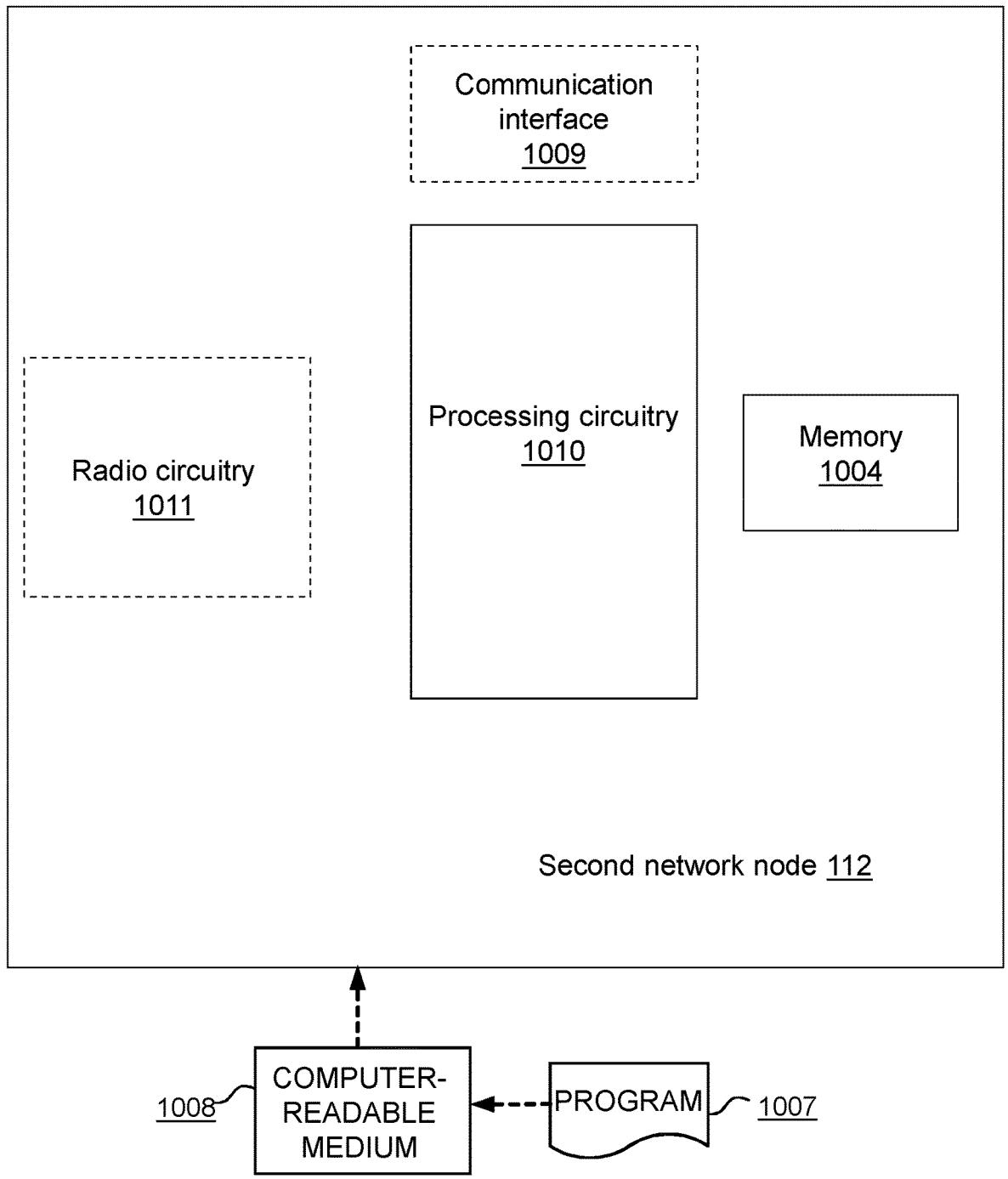
FIG. 10b is a schematic block diagram illustrating another embodiment of a second network node, according to embodiments herein.

In other embodiments, to perform the method actions described above in relation to FIG. 4, FIG. 5*c* FIG. 6*c*, and FIG. 7, the second network node 112 may comprise the following arrangement depicted in FIG. 10*b*. The second network node 112 may comprise a processing circuitry 1010, e.g., one or more processors such as the processor 1003 in the second network node 112, and the memory 1004. The second network node 112 may also comprise a radio circuitry 1011, which may comprise e.g., the receiving port 1005 and the sending port 1006. The processing circuitry 1010 may be configured to perform the method actions according to FIG. 4, in a similar manner as that described in relation to FIG. 10*a*. The radio circuitry 1011 may be configured to set up and maintain at least a wireless connection with any of the first network node 111, the third network node 113, the wireless device 130, and the host computer 150.

Hence, embodiments herein also relate to the second network node 112 operative to handle the synchronization of the wireless device 130, the second network node 112 being operative to serve the wireless device 130. The second network node 112 and the wireless device 130 are operative to operate in the wireless communications network 100. The second network node 112 comprises the processing circuitry 1010 and the memory 1004, said memory 1004 containing instructions executable by said processing circuitry 1010, whereby the second network node 112 is further operative to: a) obtain, from the first network node 111 operative to operate in the wireless communications network 100, the instruction to command the wireless device 130 to synchronize with the second network node 112, wherein to obtain is based on the result of the determination of whether or not the wireless device 130 requires synchronization, during the first time period, with the second network node 112. To obtain is further based the a prediction of at least one of: i) the data communication between the wireless device 130 and the second network node 112 during the first time period, and ii) the wireless device 130 lacking synchronization during the first time period; and operative to b) initiate, based on the obtained instruction, commanding the wireless device 130 to synchronize with the second network node 112 during the second time period, the second time period preceding the first time period, so that the synchronization procedure is completed prior to the first time period.

In some embodiments, the prediction is the mathematical estimation based the on one or more computer-derived mathematical models. The one or more computer-derived mathematical models have been derived and updated in the automated process based on at least one of: a) the historical data on data communication by the wireless device 130 or by the another wireless device; b) the simulated data on data communication by the wireless device 130 or by the another wireless device; and c) the one or more characteristics of the environment of the data communication by the wireless device 130 before one of: the first time period and the second time period.

In some embodiments, the result of the determination comprises one of: a) data communication between the wireless device 130 and the second network node 112 is predicted to occur during the first time period, and the result of the determination is that the wireless device 130 requires synchronization with the second network node 112 during the first time period; and b) the wireless device 130 is predicted to lack synchronization with the second network node 112 during the first time period, and the result of the determination is that the wireless device 130 requires synchronization with the second network node 112 during the first time period.

In some embodiments, the first time period may comprise one or more subframes and the second time period s may comprise of one or more subframes.

In some embodiments, the end of the second time period precedes the beginning of the first time period by less than ten seconds.

Figure 11:
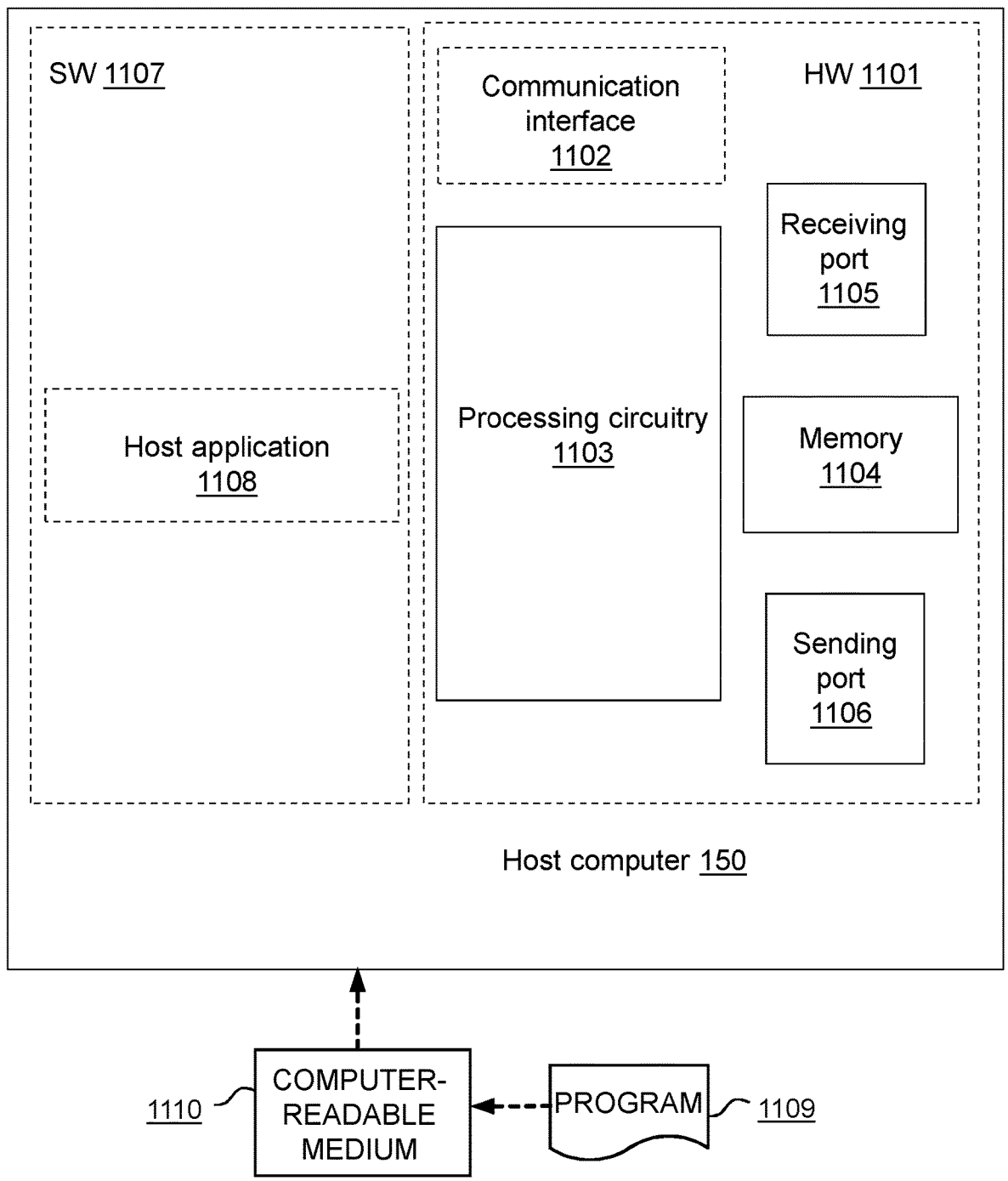
FIG. 11 is a schematic block diagram illustrating embodiments of a host computer, according to embodiments herein.

The host computer 150 may comprise the following arrangement depicted in FIG. 11. The host computer 150 comprises HardWare (HW) 1101 including a communication interface 1102 configured to set up and maintain a wired or wireless connection with an interface of a different communication device of the telecommunications system 180. The host computer 150 further comprises a processing circuitry 1103, which may have storage and/or processing capabilities. In particular, the processing circuitry 1103 may comprise one or more programmable processors, application-specific integrated circuits, field programmable gate arrays or combinations of these, not shown, adapted to execute instructions. The embodiments herein as performed by the host computer 150 may be implemented through one or more processors, such as the processing circuitry 1103 in the host computer 150 depicted in FIG. 11, together with computer program code for performing the functions and actions of the embodiments herein. The program code mentioned above may also be provided as a computer program product, for instance in the form of a data carrier carrying computer program code for performing the embodiments herein when being loaded into the in the host computer 150. One such carrier may be in the form of a CD ROM disc. It is however feasible with other data carriers such as a memory stick. The computer program code may furthermore be provided as pure program code on a server and downloaded to the host computer 150.

The processing circuit 1103 is configured to provide the user data for a user of the wireless device 130. In some embodiments, the processing circuit 1103 of the host computer 150 may be configured to execute the host application 1108, thereby providing the user data.

The processing circuit 1103 may be further configured to initiate the communication carrying the user data to the wireless device 130.

The communication interface 1102 is configured to communicate the user data to the wireless communications network 100 comprising the wireless device 130.

The hardware 1101 of the host computer 150 may further comprise a memory 1104 comprising one or more memory units. The memory 1104 is arranged to be used to store obtained information, store data, configurations, schedulings, and applications etc. to perform the methods herein when being executed in the host computer 150.

In some embodiments, the host computer 150 may receive information from, e.g., the first network node 111, the second network node 112, the third network node 113, the wireless device 130, or any network node or device, and/or another node in the wireless communications network 100 or another telecommunications network, such as an intermediate network, through a receiving port 1105. In some embodiments, the receiving port 1105 may be, for example, connected to one or more antennas in host computer 150. In other embodiments, the host computer 150 may receive information from another structure in the wireless communications network 100 through the receiving port 1105. Since the receiving port 1105 may be in communication with the processing circuitry 1103, the receiving port 1105 may then send the received information to the processing circuitry 1103. The receiving port 1105 may also be configured to receive other information.

The processing circuitry 1103 in the host computer 150 may be further configured to communicate-transmit or send-information to e.g., the first network node 111, the second network node 112, the third network node 113, the wireless device 130, and/or another node in the wireless communications network 100 or another telecommunications network, such as an intermediate network, through a sending port 1106, which may be in communication with the processing circuitry 1103, and the memory 1104.

The host computer 150 further comprises SoftWare (SW) 1107, which is stored in or accessible by the host computer 150 and executable by the processing circuitry 1103.

The software 1107 includes a host application 1108. The host application 1108 may be operable to provide a service to a remote user, such as the wireless device 130, connecting via the fifth link 160, e.g., an OTT connection, terminating at the wireless device 130 and the host computer 150. In providing the service to the remote user, the host application 1108 may provide user data which is communicated using the fifth link 160, e.g., the OTT connection.

Those skilled in the art will also appreciate that the host application 1108 described above, in some examples, may refer to a combination of analog and digital modules, and/or one or more processors configured with software and/or firmware, e.g., stored in memory, that, when executed by the one or more processors such as the processing circuitry 1103, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the host application 1108 described above may be implemented as one or more applications running on one or more processors such as the processing circuitry 1103.

Thus, the methods according to the embodiments described herein for the host computer 150 may be respectively implemented by means of a computer program 1109 product, comprising instructions, i.e., software code portions, which, when executed on at least one processing circuitry 1103, cause the at least one processing circuitry 1103 to carry out the actions described herein, as performed by the host computer 150. The computer program 1109 product may be stored on a computer-readable storage medium 1110. The computer-readable storage medium 1110, having stored thereon the computer program 1109, may comprise instructions which, when executed on at least one processing circuitry 1103, cause the at least one processing circuitry 1103 to carry out the actions described herein, as performed by the host computer 150. In some embodiments, the computer-readable storage medium 1110 may be a non-transitory computer-readable storage medium, such as a CD ROM disc, a memory stick, or stored in the cloud space. In other embodiments, the computer program 1109 product may be stored on a carrier containing the computer program 1109, wherein the carrier is one of an electronic signal, optical signal, radio signal, or the computer-readable storage medium 1110, as described above.

Example implementations, in accordance with an embodiment, of the wireless device 130, the first network node 111, the second network node 112, the third network node 113, and host computer 150 discussed in the preceding paragraphs will now be described with reference to FIG. 12. In the telecommunications system 180, the host computer 150 comprises hardware 1101 including the communication interface 1102 and the processing circuitry 1103, as described above. The software 1107 includes the host application 1108.

The telecommunications system 180 may further comprise any of the first network node 111, the second network node 112, and the third network node 113, and the wireless device 130, as described above. Any of the first network node 111, the second network node 112, and the third network node 113 comprise hardware 1201, 1202, and 1203, respectively, enabling each of them to communicate with the host computer 150 and with the wireless device 130.

Figure 12:
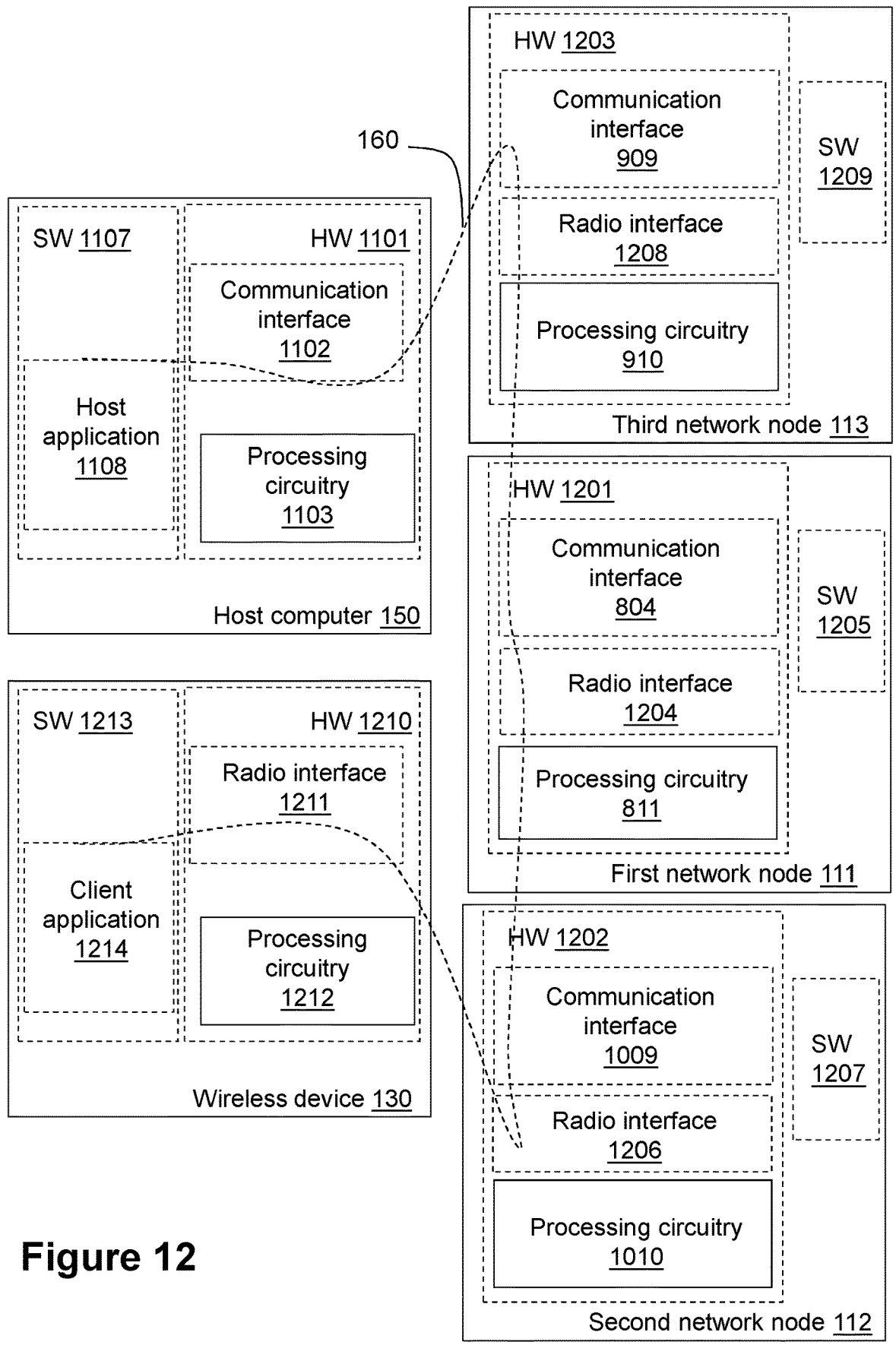
FIG. 12 is a schematic block diagram illustrating embodiments of a communications system, according to embodiments herein.

In the first network node 111, the hardware 1201 may include the communication interface 810, as well as a radio interface 1204 for setting up and maintaining at least a wireless connection with the wireless device 130 located in a coverage area, which is not shown in FIG. 12, served by the second network node 112. The communication interface 804 may be configured to facilitate a connection to the host computer 150. The connection may be direct or it may pass through a core network, not shown in FIG. 12, of the telecommunications system 180 and/or through one or more intermediate networks outside the telecommunications system 180. The first network node 111 further has a software 1205 stored internally or accessible via an external connection.

In the second network node 112, the hardware 1202 may include the communication interface 1009, as well as a radio interface 1206 for setting up and maintaining at least a wireless connection with the wireless device 130 located in a coverage area (not shown in FIG. 12) served by the second network node 112. The communication interface 1009 may be configured to facilitate a connection to the host computer 150. The connection may be direct or it may pass through a core network (not shown in FIG. 12) of the telecommunications system 180 and/or through one or more intermediate networks outside the telecommunications system 180. The second network node 112 may also have a software 1207 stored internally or accessible via an external connection.

In the third network node 113, the hardware 1203 may include the communication interface 909, as well as a radio interface 1208 for setting up and maintaining at least a wireless connection with the wireless device 130 located in a coverage area (not shown in FIG. 12) served by the second network node 112. The communication interface 909 may be configured to facilitate a connection to the host computer 150. The connection may be direct or it may pass through a core network (not shown in FIG. 12) of the telecommunications system 180 and/or through one or more intermediate networks outside the telecommunications system 180. The third network node 113 further has software 1209 stored internally or accessible via an external connection.

The telecommunication system 180 may further include the wireless device 130, which may comprise the following example arrangement depicted in FIG. 12. The wireless device comprises a hardware 1210 which may include a radio interface 1211 configured to set up and maintain the second link 142, e.g., a wireless connection, with the second network node 112, serving a coverage area in which the wireless device 130 is currently located. The hardware 1210 of the wireless device 130 further includes a processing circuitry 1212, which may comprise one or more programmable processors, application-specific integrated circuits, field programmable gate arrays or combinations of these (not shown) adapted to execute instructions. The wireless device 130 further comprises software 1213, which is stored in or accessible by the wireless device 130 and executable by the processing circuitry 1212. The software 1213 includes a client application 1214. The client application 1214 may be operable to provide a service to a human or non-human user via the wireless device 130, with the support of the host computer 150. In the host computer 150, an executing host application 1108 may communicate with the executing client application 1214 via the fifth link 160, e.g., an OTT connection, terminating at the wireless device 130, and the host computer 150. In providing the service to the user, the client application 1214 may receive request data from the host application 1108 and provide user data in response to the request data. The fifth link 160 may transfer both the request data and the user data. The client application 1214 may interact with the user to generate the user data that it provides.

The inner workings of the first network node 111, the second network node 112, the third network node 113, the wireless device 130, and the host computer 150 may be as shown in FIG. 12 and independently, the surrounding network topology may be that of FIG. 1.

In FIG. 12, the fifth link 160, which is in this FIG. 12 an OTT connection, has been drawn schematically to illustrate the communication between the host computer 150 and the wireless device 130 via the first network node 111, the second network node 112, and the third network node 113, without explicit reference to any intermediary devices and the precise routing of messages via these devices. Network infrastructure may determine the routing, which it may be configured to hide from the wireless device 130 or from the service provider operating the host computer 150, or both. While the OTT connection is active, the network infrastructure may further take decisions by which it dynamically changes the routing, e.g., on the basis of load balancing consideration or reconfiguration of the network.

The fifth link 160 between the wireless device 130 and any of the first network node 111, the second network node 112, and the third network node 113, as the case may be, is in accordance with the teachings of the embodiments described throughout this disclosure. One or more of the various embodiments improve the performance of OTT services provided to the wireless device 130 using the OTT connection of the fifth link 160, in which the wireless connection of the second link 142 forms the last segment. More precisely, the teachings of these embodiments may improve the handling of the synchronization of the wireless device 130, and thereby provide benefits such as allowing for uplink synchronization without unnecessary signalling, and allowing to reduce added delay due to uplink synchronization being performed prior to data transmission, and not upon data arrival.

A measurement procedure may be provided for the purpose of monitoring data rate, latency and other factors on which the one or more embodiments improve. There may further be an optional network functionality for reconfiguring the OTT connection of the fifth link 160 between the host computer 150 and wireless device 130, in response to variations in the measurement results. The measurement procedure and/or the network functionality for reconfiguring the fifth link 160 may be implemented in the software 1107 of the host computer 150 or in the software 1213 of the wireless device 130, or both. In embodiments, sensors (not shown) may be deployed in or in association with communication devices through which the fifth link 160 passes; the sensors may participate in the measurement procedure by supplying values of the monitored quantities exemplified above, or supplying values of other physical quantities from which software 1107, 1213 may compute or estimate the monitored quantities. The reconfiguring of the fifth link 160 may include message format, retransmission settings, preferred routing etc.; the reconfiguring need not affect any of the first network node 111, the second network node 112, and the third network node 113, and it may be unknown or imperceptible to any of the first network node 111, the second network node 112, and the third network node 113. Such procedures and functionalities may be known and practiced in the art. In certain embodiments, measurements may involve proprietary wireless device signaling facilitating the host computer's 150 measurements of throughput, propagation times, latency and the like. The measurements may be implemented in that the software 1213, causes messages to be transmitted, in particular empty or 'dummy' messages, using the fifth link 160, while it monitors propagation times, errors etc.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

The invention claimed is:

1. A method, performed by a first network node, for handling synchronization of a wireless device, the first network node and the wireless device operating in a wireless communications network, the method comprising:
   determining whether or not the wireless device requires synchronization, during a first time period, with a second network node serving the wireless device, the determining being based on a prediction of at least one of:
   a) data communication between the wireless device and the second network node during the first time period; and
   b) the wireless device lacking synchronization during the first time period; and
   based on a result of the determination, initiating, or avoiding initiating, a synchronization procedure of the wireless device with the second network node during a second time period, the second time period preceding the first time period, so that the synchronization procedure, if initiated, is completed prior to the first time period.

2. The method according to claim 1, wherein one of:
   a. the result of the determination is that the wireless device requires synchronization during the first time period, and wherein said initiating or avoiding initiating comprises initiating the synchronization procedure, and
   b. the result of the determination is that the wireless device does not require synchronization during the first time period, and wherein said initiating or avoiding initiating comprises avoiding initiating the synchronization procedure.

3. The method according to claim 1, wherein the prediction is a mathematical estimation based on one or more computer-derived mathematical models, the one or more computer-derived mathematical models having been derived and updated in an automated process based on at least one of:
   a. historical data on data communication by the wireless device or by another wireless device;
   b. simulated data on data communication by the wireless device or by another wireless device; and
   c. one or more characteristics of an environment of the data communication by the wireless device before one of: the first time period and the second time period.

4. The method according to claim 1, wherein the initiating the synchronization procedure of the wireless device with the second network node comprises providing, to the second network node, an instruction to command the wireless device to synchronize with the second network node.

5. The method according to claim 1, wherein the determining being based on the prediction comprises one of:
   a. data communication between the wireless device and the second network node is predicted to occur during the first time period, and the result of the determination is that the wireless device requires synchronization with the second network node during the first time period;
   b. data communication between the wireless device and the second network node is predicted to not occur during the first time period, and the result of the determination is that the wireless device does not require synchronization with the second network node during the first time period;
   c. the wireless device is predicted to lack synchronization with the second network node during the first time period, and the result of the determination is that the wireless device requires synchronization with the second network node during the first time period; and
   d. the wireless device is predicted to be synchronized with the second network node during the first time period, and the result of the determination is that the wireless device does not require synchronization with the second network node during the first time period.

6. The method according to claim 1, wherein the first time period comprises one or more first subframes and the second time period comprises one or more second subframes, and wherein an end of the second time period precedes a beginning of the first time period by less than ten seconds.

7. A first network node operative to handle synchronization of a wireless device, the first network node and the wireless device being operative to operate in a wireless communications network, the first network node comprising a processing circuitry and a memory, said memory containing instructions executable by said processing circuitry, whereby the first network node is further operative to:
 determine whether or not the wireless device requires synchronization, during a first time period, with a second network node operative to serve the wireless device, based on a prediction of at least one of:
  a) data communication between the wireless device and the second network node during the first time period, and
  b) the wireless device lacking synchronization during the first time period, and
 based on a result of the determination, initiate or avoid initiating a synchronization procedure of the wireless device with the second network node during a second time period, the second time period preceding the first time period, so that the synchronization procedure, if initiated, is completed prior to the first time period.

8. The first network node according to claim 7 wherein the first network node is operative to one of:
 a. initiate the synchronization procedure when the result of the determination is that the wireless device requires synchronization during the first time period, and
 b. avoid initiation of the synchronization procedure when the result of the determination is that the wireless device does not require synchronization during the first time period.

9. The first network node according to claim 7, wherein the prediction is a mathematical estimation based on one or more computer-derived mathematical models, the one or more computer-derived mathematical models having been derived and updated in an automated process based on at least one of:
 a. historical data on data communication by the wireless device or by another wireless device;
 b. simulated data on data communication by the wireless device or by another wireless device; and
 c. one or more characteristics of an environment of the data communication by the wireless device before one of: the first time period and the second time period.

10. The first network node according to claim 7, wherein to initiate the synchronization procedure of the wireless device with the second network node comprises to provide, to the second network node, an instruction to command the wireless device to synchronize with the second network node.

11. The first network node according to claim 7, wherein one of:
 a. when data communication between the wireless device and the second network node is predicted to occur during the first time period, the result of the determination is that the wireless device requires synchronization with the second network node during the first time period;
 b. when data communication between the wireless device and the second network node is predicted to not occur during the first time period, the result of the determination is that the wireless device does not require synchronization with the second network node during the first time period;
 c. when the wireless device is predicted to lack synchronization with the second network node during the first time period, the result of the determination is that the wireless device requires synchronization with the second network node during the first time period; and
 d. when the wireless device is predicted to be synchronized with the second network node during the first time period, the result of the determination is that the wireless device does not require synchronization with the second network node during the first time period.

12. The first network node according to claim 7, wherein the first time period comprises one or more first subframes and the second time period comprises one or more second subframes.

13. The first network node according to claim 7, wherein an end of the second time period precedes a beginning of the first time period by less than ten seconds.

14. A third network node operative to handle synchronization of a wireless device, the third network node and the wireless device being operative to operate in a wireless communications network, the third network node comprising a processing circuitry and a memory, said memory containing instructions executable by said processing circuitry, whereby the third network node is further operative to:
 obtain a prediction of a wireless device lacking synchronization, during a first time period, with a second network node operative to serve the wireless device, and
 initiate providing an indication of the obtained prediction to a first network node operative to operate in the wireless communications network, wherein to initiate is performed before a second time period, the second time period preceding the first time period, so that the synchronization procedure is enabled to be completed prior to the first time period.

15. The third network node according to claim 14, wherein the prediction is a mathematical estimation based on one or more computer-derived mathematical models, the one or more computer-derived mathematical models having been derived and updated in an automated process based on at least one of:
 a. historical data on data communication by the wireless device or by another wireless device;
 b. simulated data on data communication by the wireless device or by another wireless device; and
 c. one or more characteristics of an environment of the data communication by the wireless device before one of: the first time period and the second time period.

16. A second network node operative to handle synchronization of a wireless device, the second network node being operative to serve the wireless device, the second network node and the wireless device being operative to operate in a wireless communications network, the second network node comprising a processing circuitry and a memory, said memory containing instructions executable by said processing circuitry, whereby the second network node is further operative to:
 obtain, from a first network node operative to operate in the wireless communications network, an instruction to command the wireless device to synchronize with the second network node, wherein the instruction is obtained based on a result of a determination of whether or not the wireless device requires synchronization, during a first time period, with the second network node, wherein the instruction is obtained further based on a prediction of at least one of:

a) data communication between the wireless device and the second network node during the first time period, and
b) the wireless device lacking synchronization during the first time period, and initiate, based on the obtained instruction, commanding the wireless device to synchronize with the second network node during a second time period, the second time period preceding the first time period, so that synchronization is completed prior to the first time period.

17. The second network node according to claim 16, wherein the prediction is a mathematical estimation based on one or more computer-derived mathematical models, the one or more computer-derived mathematical models having been derived and updated in an automated process based on at least one of:

a. historical data on data communication by the wireless device or by another wireless device;
b. simulated data on data communication by the wireless device or by another wireless device; and
c. one or more characteristics of an environment of the data communication by the wireless device before one of: the first time period and the second time period.

18. The second network node according to claim 16, wherein one of:

a. data communication between the wireless device and the second network node is predicted to occur during the first time period, and the result of the determination is that the wireless device requires synchronization with the second network node during the first time period; and
b. the wireless device is predicted to lack synchronization with the second network node during the first time period, and the result of the determination is that the wireless device requires synchronization with the second network node during the first time period.

19. The second network node according to claim 16, wherein the first time period comprises one or more subframes and the second time period s comprises of one or more subframes.

20. The second network node according to claim 16, wherein an end of the second time period precedes a beginning of the first time period by less than ten seconds.

* * * * *